(12) United States Patent
Oberman et al.

(10) Patent No.: US 8,037,119 B1
(45) Date of Patent: Oct. 11, 2011

(54) MULTIPURPOSE FUNCTIONAL UNIT WITH SINGLE-PRECISION AND DOUBLE-PRECISION OPERATIONS

(75) Inventors: Stuart F. Oberman, Sunnyvale, CA (US); Ming Y. Siu, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1209 days.

(21) Appl. No.: 11/359,353

(22) Filed: Feb. 21, 2006

(51) Int. Cl.
*G06F 7/44* (2006.01)
(52) U.S. Cl. ........................................ 708/503
(58) Field of Classification Search .............. 708/444, 708/620, 513, 499, 500–508
See application file for complete search history.

(56) References Cited

U.S. PATENT DOCUMENTS

| | | | |
|---|---|---|---|
| 4,771,379 A | | 9/1988 | Ando et al. |
| 4,893,268 A | * | 1/1990 | Denman et al. ............ 708/627 |
| 4,969,118 A | | 11/1990 | Montoye et al. |
| 4,972,362 A | | 11/1990 | Elkind et al. |
| 5,068,816 A | | 11/1991 | Noetzel |
| 5,241,636 A | | 8/1993 | Kohn |
| 5,450,556 A | | 9/1995 | Slavenburg et al. |
| 5,452,241 A | | 9/1995 | Desrosiers et al. |
| 5,487,022 A | | 1/1996 | Simpson et al. |
| 5,517,438 A | | 5/1996 | Dao-Trong et al. |
| 5,524,090 A | * | 6/1996 | Iwamura ...................... 708/625 |
| 5,524,244 A | | 6/1996 | Robinson et al. |
| 5,548,545 A | | 8/1996 | Brashears et al. |
| 5,561,810 A | * | 10/1996 | Ohtomo ....................... 708/490 |
| 5,581,778 A | | 12/1996 | Chin et al. |
| 5,673,407 A | | 9/1997 | Poland et al. |
| 5,701,405 A | * | 12/1997 | Kelley et al. .................. 345/441 |
| 5,734,874 A | * | 3/1998 | Van Hook et al. ............ 345/559 |
| 6,061,781 A | | 5/2000 | Jain et al. |
| 6,198,488 B1 | | 3/2001 | Lindholm et al. |
| 6,243,732 B1 | | 6/2001 | Arakawa et al. |
| 6,317,133 B1 | | 11/2001 | Root et al. |
| 6,363,476 B1 | | 3/2002 | Ide |
| 6,480,872 B1 | | 11/2002 | Choquette |
| 6,490,607 B1 | * | 12/2002 | Oberman ....................... 708/620 |
| 6,557,022 B1 | | 4/2003 | Sih et al. |
| 6,873,324 B2 | | 3/2005 | Saito et al. |

(Continued)

FOREIGN PATENT DOCUMENTS

GB 2455401 B 5/2010

(Continued)

OTHER PUBLICATIONS

"High-Speed Double-Precision Computation of Reciprocal, Division, Square Root, and Inverse Square Root", Bruguera et al, IEEE Transactions on Computers, vol. 51, No. 12, Dec. 2002.*

(Continued)

*Primary Examiner* — Lewis Bullock, Jr.
*Assistant Examiner* — Kevin G Hughes
(74) *Attorney, Agent, or Firm* — Kilpatrick Townsend & Stockton LLP

(57) ABSTRACT

A multipurpose arithmetic functional unit selectably performs planar attribute interpolation, unary function approximation, and double-precision arithmetic. In one embodiment, planar interpolation operations for coordinates (x, y) are executed by computing A*x+B*y+C, and unary function approximation operations for operand x are executed by computing $F_2(x_b)*x_h^2+F_1(x_b)*x_h+F_0(x_b)$, where $x_h=x-x_b$. Shared multiplier and adder circuits are advantageously used to implement the product and sum operations for unary function approximation and planar interpolation; the same multipliers and adders are also leveraged to implement double-precision multiplication and addition.

17 Claims, 13 Drawing Sheets

U.S. PATENT DOCUMENTS

| | | | |
|---|---|---|---|
| 6,895,423 | B2 | 5/2005 | Kawata |
| 6,912,557 | B1 | 6/2005 | North et al. |
| 6,976,043 | B2 | 12/2005 | Clifton |
| 7,437,538 | B1 | 10/2008 | Brooks et al. |
| 7,484,076 | B1 | 1/2009 | Oberman et al. |
| 7,617,384 | B1 | 11/2009 | Coon et al. |
| 7,640,285 | B1 | 12/2009 | Oberman et al. |
| 7,747,842 | B1 | 6/2010 | Goudy et al. |
| 2004/0085321 | A1 | 5/2004 | Oka et al. |
| 2005/0235134 | A1 | 10/2005 | O'Sullivan |
| 2005/0273769 | A1 | 12/2005 | Eichenberger et al. |
| 2006/0098021 | A1 | 5/2006 | Rim et al. |
| 2009/0049276 | A1 | 2/2009 | Bergland et al. |

FOREIGN PATENT DOCUMENTS

| | | |
|---|---|---|
| JP | 7-281872 A2 | 10/1995 |

OTHER PUBLICATIONS

Pineiro et al., "Faithful Powering Computation Using Table Look-up and a Fused Accumulation Tree" Proceedings of the 15th IEEE Symposium on Computer Arithmetic (ARITH'01), (2001).

Jean-Michel Muller, "Partially rounded" Small-Order Approximations for Accurate, Hardware-Oriented, Table-Based Methods Proceedings of the 16th IEEE Symposium on Computer Arithmetic (ARITH'03), (2003).

Tannenbaum, Andrew, Structured Computer Organization, 2nd ed., Prentice-Hall, 1984, p. 11.

Jain, et al., "Rapid System Prototyping for High Performance Reconfigurable Computing," Design Automation for Embedded Systems, Kluwer Academic Publishers, Boston, vol. 5, pp. 339-350, 2000.

Jain, et al., "Hardware Implementation, of a Nonlinear Processor," Proceedings of the 1999 IEEE International Symposium on Circuits and Systems, May 30-Jun. 2, 1999, vol. 6, pp. 509-514.

Ligon, et al., "Implementation and Analysis of Numerical Components for Reconfigurable Computing," Proceedings of the 1999 IEEE Aerospace Conference, Mar. 6-13, 1999, vol. 2, pp. 325-335.

Piñeiro et al., "Faithful Powering Computation Using Table Look-up and a Fused Accumulation Tree" Proceedings of the 15th IEEE Symposium on Computer Arithmetic (ARITH'01), (2001).

Muller, "Partially rounded" Small-Order Approximations for Accurate, Hardware-Oriented, Table Based Methods Proceedings of the 16th IEEE Symposium on Computer Arithmetic (ARITH'03), (2003).

Kurzak, Jakub et al.; "Implementation of the Mixed-Precision High Performance LINPACK Benchmark on the CELL Processor"; 2006, Technical Report No. UT-CS-06-580, Department of Computer Science, University of Tennessee, 12 pages.

Owens, John D., et al., "A Survey of General-Purpose Computation on Graphics Hardware," Eurographics 2005, State of Art Reports, pp. 21-51, (Aug. 2005).

Schwarz, Eric M., "FPU Implementations with Denormalized Numbers," IEEE Trans. on Computers, vol. 55. No. 7. pp. 825-835, (Jul. 2005).

He, Hu, et al., "Multiply-Add Fused Float Point Unit with On-fly Denormalized Number Processing," IEEE, pp. 1466-1468, (2005).

Bedard, N., et al., "The Weitek 64-bit Floating-Point Datapath Unit," Weitek Corporation, Maple Press, pp. 898-902, (1988).

Office Action dated May 25, 2011, Japanese Patent Application No. 2007-541334, in related case 019680-012000JP, 3 pages (in Japanese).

Office Action of Feb. 10, 2011 in related U.S. Appl. No. 10/970,253.
Office Action of Aug. 31, 2010 in related U.S. Appl. No. 10/970,253.
Office Action of Oct. 14, 2009 in related U.S. Appl. No. 10/970,253.
Office Action of Jul. 31, 2008 in related U.S. Appl. No. 10/970,253.
Office Action of Dec. 18, 2007 in related U.S. Appl. No. 10/970,253.
Office Action of Feb. 15, 2011 in related U.S. Appl. No. 11/611,800.
Office Action of Oct. 6, 2010 in related U.S. Appl. No. 11/611,800.

\* cited by examiner

| UNARY FUNCTION APPROXIMATION (UFA) | | | | |
|---|---|---|---|---|
| NAME | REDUCED RANGE | OPERAND FORMAT | RESULT | POST-PROCESSING |
| SIN, COS | [0,1) | 25 fraction bits (x) | sin x, cos x | (none) |
| EXP | n/a | 7 integer bits (I) 23 fraction bits (x) | $2^x$ | $*2^I$ |
| LOG | n/a | fp32 (s.$E.M$); x=1.$M$ | $\log_2 x + E$ | (none) |
| RCP | [1,2) | fp32 (s.$E.M$); x=1.$M$ | $1/x$ | $*2^{-E}$ |
| RSQ | [1,4) | fp32 (s.$E.M$); x=1.$M$ | $x^{-1/2}$ | $*2^{-E/2}$ |

| PLANAR INTERPOLATION (PI) | | |
|---|---|---|
| NAME | INPUTS | RESULT |
| IPA | A,B,C: fp32<br>x,y: s13<br>$dx_i$, $dy_i$: u4 (4 sets) | $U = A*x + B*y + C$<br>(for 4 fragments) |
| IPA | A,B,C: fp32<br>x,y: s13<br>$dx_i$, $dy_i$: u4 (4 sets) | $U*w'$ (for 4 fragments), where $U = A*x + B*y + C$ |

| DOUBLE-PRECISION ARITHMETIC | | |
|---|---|---|
| NAME | INPUTS | RESULT |
| DADD | $\alpha, \beta$: fp64 | $\alpha + \beta$ |
| DMUL | $\alpha, \beta$: fp64 | $\alpha * \beta$ |

*FIG. 3*

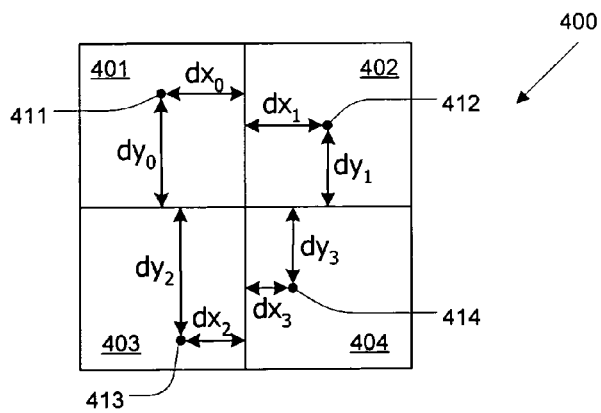

*FIG. 4*

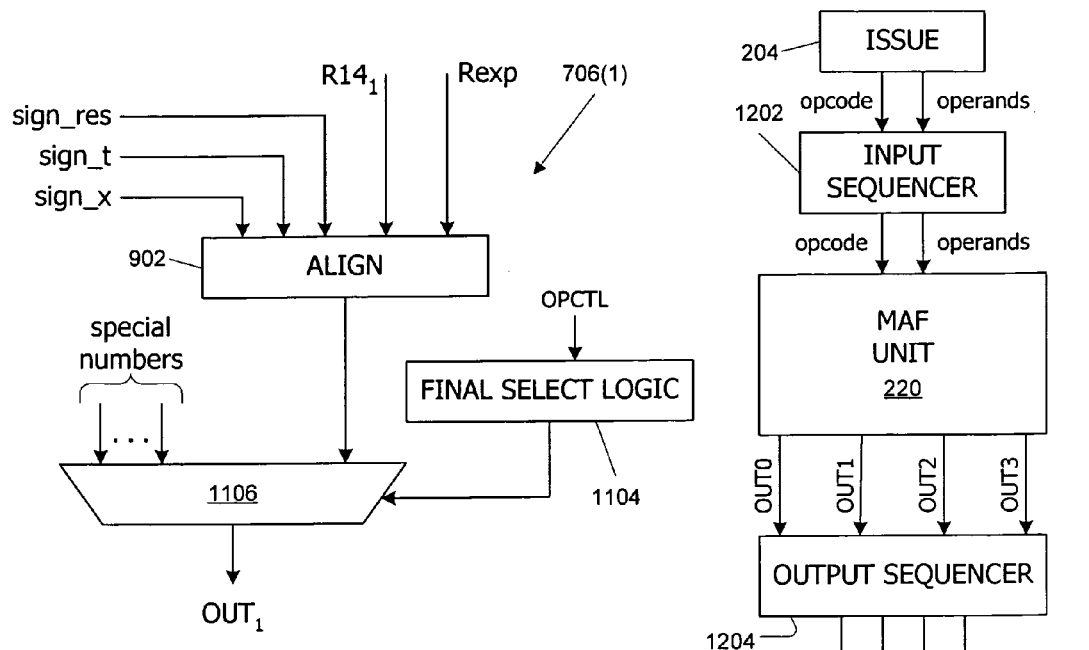
FIG. 11
FIG. 12
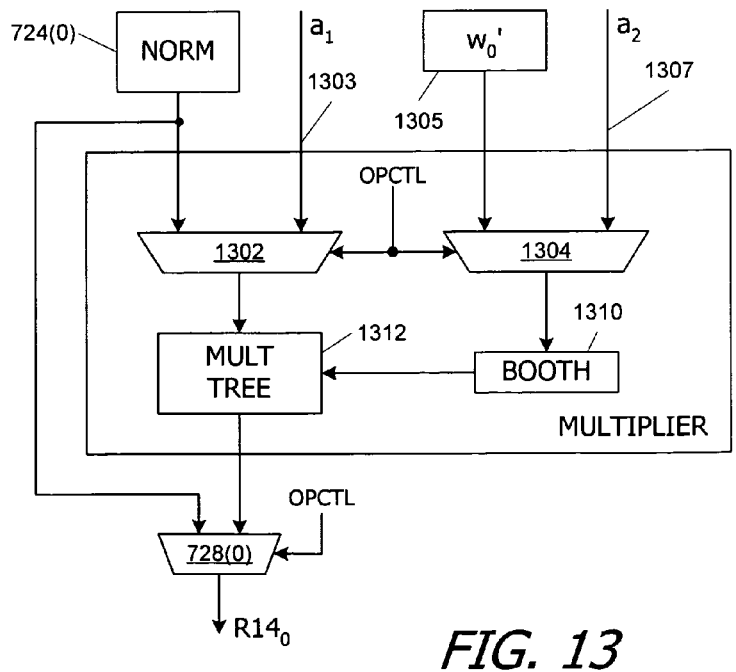
FIG. 13

MULTIPURPOSE FUNCTIONAL UNIT WITH SINGLE-PRECISION AND DOUBLE-PRECISION OPERATIONS

CROSS-REFERENCES TO RELATED APPLICATIONS

The present disclosure is related to the following commonly-assigned co-pending U.S. patent applications: application Ser. No. 10/861,184, filed Jun. 3, 2004, entitled "High-Speed Function Approximation"; application Ser. No. 10/970,101, filed Oct. 20, 2004, entitled "Multipurpose Arithmetic Functional Unit"; and application Ser. No. 10/970,253, filed Oct. 20, 2004, entitled "Multipurpose Arithmetic Functional Unit." The respective disclosures of these applications are incorporated herein by reference for all purposes.

BACKGROUND OF THE INVENTION

The present invention relates in general to microprocessors, and in particular to a multipurpose arithmetic functional unit for a processor core with single-precision and double-precision operations.

Real-time computer animation places extreme demands on processors. To meet these demands, dedicated graphics processing units typically implement a highly parallel architecture in which a number (e.g., 16) of cores operate in parallel, with each core including multiple (e.g., 8) parallel pipelines containing functional units for performing the operations supported by the processing unit. These operations generally include various integer and floating point arithmetic operations such as addition; multiplication; various algebraic, transcendental, and trigonometric functions; and planar attribute interpolation. The pipelines are generally of identical design so that any supported instruction can be processed by any pipeline; accordingly, each pipeline requires a complete set of functional units.

Conventionally, each functional unit is specialized to handle only one or two operations, and the pipelines usually provide sequential arrangements of functional units designed to optimize execution time for an expected sequence of operations (e.g., for vertex or fragment shading operations). For example, the functional units in a pipeline might include an attribute interpolation unit, followed by a texture computation unit, followed by various arithmetic units for computing sums, products, logarithms, exponents, trigonometric functions, and the like. Each of these functional units consumes chip area and power, adding to the design complexity and cost. Further, because it is specialized, a given functional unit is useful only a fraction of the time.

Conventional functional units for graphics processors are also designed to operate on "single-precision" (e.g., 32-bit) operands and produce single-precision results. Operating at double precision generally requires wider adders and larger multipliers than single-precision operations. These double-precision circuits can be used for single-precision arithmetic, in some instances at the price of additional complexity. Some processors include separate single-precision and double-precision functional units, but providing two sets of functional units increases chip area and costs.

Graphics applications, at least at present, do not generally use double precision. However, there is interest in leveraging graphics processors for general-purpose computations, which often do require double precision. It would, therefore, be desirable to provide functional units capable of single-precision and double-precision operations at low additional cost, allowing graphics processors to be used for a wider range of computational tasks.

BRIEF SUMMARY OF THE INVENTION

Embodiments of the present invention provide high-speed multipurpose arithmetic functional units that support double-precision arithmetic operations. Such functional units may be used in any processing system capable of performing large numbers of high-speed computations, such as a graphics processor. In one embodiment, in addition to executing double-precision addition and multiplication operations the functional unit can execute single-precision planar interpolation operations by computing $U(x, y)=A*x+B*y+C$ and can also execute single-precision unary function operations by computing an approximation of the form $f(x) \approx F_2(x_b)*x_h^2 + F_1(x_b)*x_h + F_0(x_b)$ (where $x_h = x - x_b$). This approximation can be used for various algebraic and transcendental functions including reciprocals, square roots, logarithms, exponents, and trigonometric functions. Shared multiplier and adder circuits are advantageously used to implement the product and sum operations for all classes of operations.

According to one aspect of the present invention, a multipurpose functional unit for a processor includes an input section, a multiplication pipeline, and an addition pipeline. The input section configured to receive an opcode designating one of a number of supported operations to be performed and one or more operands on which the designated operation is to be performed. The input section is also configured to generate control and data signals in response to the received opcode and operands. The multiplication pipeline includes a multiplier circuit having a height and a width, at least one of the height or the width being less than a double-precision mantissa size. The multiplication pipeline is coupled to receive a first subset of the control and data signals from the input section and is configured to select factors based on the received control and data signals and to operate the multiplier circuit to compute one or more products from the selected factors. The addition pipeline is coupled to receive one or more products from the multiplication section and is configured to perform an addition operation using the one or more products to produce an operation result. The supported operations include a double precision multiplication (DMUL) operation that is executed using multiple iterations through at least a portion of the multiplication pipeline and at least a portion of the addition pipeline.

In one embodiment, the width of the multiplier circuit is at least half of the double-precision mantissa size but less than the double-precision mantissa size; the multiplication pipeline is configured such that in the event that the opcode designates the DMUL operation, during each iteration through the portion of the multiplication pipeline, the multiplier circuit multiplies an upper half or a lower half of a first double-precision mantissa by at least a portion of a second double-precision mantissa.

In another embodiment, the height of the multiplier circuit is smaller than the double-precision mantissa size; the multiplication pipeline is configured such that in the event that the opcode designates the DMUL operation, during each iteration through the portion of the multiplication pipeline, the multiplier circuit multiplies at least a portion of a first double-precision mantissa by a portion of a second double-precision mantissa.

In some embodiments, the addition pipeline is configured such that in the event that the opcode designates the DMUL operation, during each iteration through the portion of the addition pipeline, the addition pipeline adds the one or more products produced by the multiplication pipeline to a running sum result.

Various operations may be supported in addition to the DMUL operation. For example, in some embodiments, the supported operations also includes a unary function approximation (UFA) operation and a planar interpolation (PI) operation, with the UFA operation and the PI operation each being executed using a single pass through the multiplication pipeline and the addition pipeline. In one embodiment, the UFA operation for an input operand x and a unary function $f(x)$ to be approximated includes computation of a quadratic polynomial of the form $f(x)$ $F_2(x_b)^*x_h^2 + F_1(x_b)^*x_h + F_0(x_b)$, where $x_b$ is a baseline value, $x_h$ is the difference between the input operand x and the baseline value $x_b$, and $F_2$, $F_1$, and $F_0$ are coefficients determined based on the baseline value $x_b$ and the unary function $f(x)$. In another embodiment, the PI operation for input coordinates (x, y) includes computation of a planar function U(x, y) of the form $U(x, y)=A^*x+B^*y+\Delta$, where A, B, and C are interpolation parameters and $\Delta$ is an offset term that depends at least in part on the interpolation parameter C. The input operand x and the coefficients $F_2$, $F_1$, and $F_0$ for the UFA operation, as well as the input coordinates (x, y) and the interpolation parameters A, B, and C for the PI operation, can each have a size smaller than a double-precision mantissa size.

According to another aspect of the present invention, a multipurpose functional unit for a processor includes an input section, a multiplication pipeline, and an addition pipeline. The input section is configured to receive an opcode designating one of a number of supported operations to be performed and one or more operands on which the designated operation is to be performed. The input section is also configured to generate control and data signals in response to the received opcode and operands. The multiplication pipeline includes at least two multiplier circuits, each of the multiplier circuits having a height that is less than a double-precision mantissa size. The multiplication pipeline is coupled to receive a first subset of the control and data signals from the input section and is configured to select at least two pairs of factors based on the received control and data signals and to operate the multiplier circuits to compute a respective one of at least two products from each of the pairs of factors. The addition pipeline coupled to receive the products from the multiplication pipeline and is configured to add the products to produce an operation result. The plurality of supported operations includes a double precision multiplication (DMUL) operation that is executed using multiple iterations through at least a portion of the multiplication pipeline and at least a portion of the addition pipeline.

In one embodiment, the input section includes an operand preparation unit configured to receive first and second double-precision input operands having respective first and second mantissas. The operand preparation unit is configured such that in the event that the opcode designates the DMUL operation, the second mantissa is split into at least two portions and the first mantissa and a different one of the portions of the second mantissa are delivered to the multiplication pipeline during each of the iterations through the multiplication section. If each of the multipliers has a width that is less than the double-precision mantissa size, the operand preparation unit can be configured such that in the event that the opcode designates the DMUL operation, the first mantissa is split into at least two portions and at least two portions of the first mantissa are delivered to the multiplication pipeline during each of the iterations through the multiplication pipeline. Each of the multiplier circuits advantageously multiplies a different one of the portions of the first mantissa received from the operand preparation unit by the one of the portions of the second mantissa received from the operand preparation unit.

In some embodiments, the addition pipeline is configured such that in the event that the opcode designates the DMUL operation, during each iteration through the portion of the addition pipeline, the addition pipeline adds the plurality of products produced by the multiplication pipeline to a running sum result. Further, the addition pipeline can reduce the least significant bits of the running sum result to a single bit during each iteration through the portion of the addition pipeline.

In some embodiments, the supported operations also include a double-precision addition (DADD) operation that adds first and second double-precision operands having respective first and second mantissas. The multiplication pipeline can be configured such that, in the event that the opcode designates the DADD operation, the multiplication pipeline supplies the first and second mantissas to the addition pipeline via a path that bypasses the multiplier circuits; the addition pipeline can be configured such that, in the event that the opcode designates the DADD operation, the addition pipeline adds the first and second mantissas.

Other operations can also be supported, including a unary function approximation (UFA) operation and/or a planar interpolation (PI) operation that are each executed using a single pass through the multiplication pipeline and the addition pipeline.

According to still another aspect of the present invention, a method for operating a functional unit of a microprocessor includes receiving an opcode designating one of a number of supported operations to be performed and one or more operands on which the designated operation is to be performed. The supported operations include a double-precision multiplication (DMUL operation) and at least one other operation that operates on operands at less than double precision. In the event that the opcode designates an operation other than the DMUL operation, inputs M2, $\mu 2$, M1, $\mu 1$ and M0 are selected in response to the opcode and the one or more operands; a pair of multiplier circuits in the functional unit are operated to compute products of the form M2$^*\mu 2$ and M1$^*\mu 1$ from the selected inputs M2, $\mu 2$, M1, and $\mu 1$; and an addition block in the functional unit is operated to compute an operation result of the form M2$^*\mu 2$+M1$^*\mu 1$+M0 from the products M2$^*\mu 2$ and the selected input M0. In the event that the opcode designates the DMUL operation, for each of at least two iterations within the functional unit, a first portion and a second portion of a mantissa of a first input operand are selected as inputs M2 and M1, respectively, while a portion of a mantissa of a second input operand as both of inputs $\mu 2$ and $\mu 1$, with a different portion of the mantissa of the second input operand being selected for each of the plurality of iterations. The addition block in the functional unit is operated to add the products M2$^*\mu 2$ and M1$^*\mu 1$ to a running sum.

In some embodiments, the supported operations also include a unary function approximation (UFA) operation for approximating a unary function $f(x)$ of an argument operand x and a planar interpolation (PI) operation for performing planar interpolation on coordinate operands x and y. For instance, if the UFA operation is designated, the inputs M2, $\mu 2$, M1, $\mu 1$ and M0 are advantageously selected such that the configurable arithmetic circuits compute an operation result corresponding to $F_2(x_b)^*x_h^2 + F_1(x_b)^*x_h + F_0(x_b)$, where $x_b$ is a baseline value, $x_h$ is the difference between the argument operand x and the baseline value $x_b$, and $F_2$, $F_1$, and $F_0$ are coefficients determined based on the baseline value $x_b$ and the unary function $f(x)$. If the PI operation is designated, the inputs M2, μ2, M1, μ1 and M0 are advantageously selected such that the configurable arithmetic circuits compute an operation result corresponding to A*x+B*y+Δ, where A, B, and C are interpolation parameters and Δ is an offset term that depends at least in part on the interpolation parameter C.

The following detailed description together with the accompanying drawings will provide a better understanding of the nature and advantages of the present invention.

BRIEF DESCRIPTION OF THE DRAWINGS

FIG. 3 is a listing of operations performed by a multipurpose arithmetic functional unit according to an embodiment of the present invention;

FIG. 4 illustrates a quad of fragments;

FIG. 11 is a block diagram of an output control block for the multipurpose arithmetic functional unit of FIG. 7A;

FIG. 12 is a block diagram of a multipurpose arithmetic functional unit with input and output sequencing logic according to an embodiment of the present invention; and FIG. 13 is a block diagram of a multiplier block that supports a single-precision multiplication (SMUL) operation in addition to a planar interpolation operation.

DETAILED DESCRIPTION OF THE INVENTION

Embodiments of the present invention provide high-speed multipurpose arithmetic functional units that support double-precision arithmetic operations. Such functional units may be used in any processing system capable of performing large numbers of high-speed computations, such as a graphics processor. In one embodiment, in addition to executing double-precision addition and multiplication operations the functional unit can execute single-precision planar interpolation operations by computing $U(x, y)=A*x+B*y+C$ and can also execute single-precision unary function operations by computing an approximation of the form $f(x) \approx F_2(x_b)*x_h^2+F_1(x_b)*x_h+F_0(x_b)$ (where $x_h=x-x_b$). This approximation can be used for various algebraic and transcendental functions including reciprocals, square roots, logarithms, exponents, and trigonometric functions. Shared multiplier and adder circuits are advantageously used to implement the product and sum operations for all classes of operations.

I. System Overview

A. Graphics Processor

Figure 1:
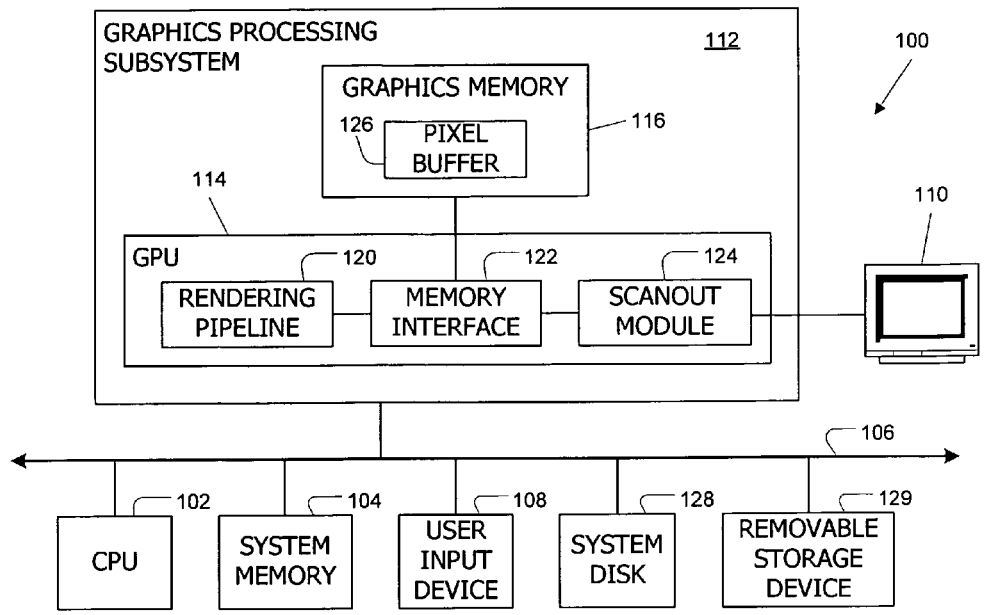
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus 106. User input is received from one or more user input devices 108 (e.g., keyboard, mouse) coupled to bus 106. Visual output is provided on a pixel based display device 110 (e.g., a conventional CRT or LCD based monitor) operating under control of a graphics processing subsystem 112 coupled to system bus 106. A system disk 128 and other components, such as one or more removable storage devices 129 (e.g., floppy disk drive, compact disk (CD) drive, and/or DVD drive), may also be coupled to system bus 106. System bus 106 may be implemented using one or more of various bus protocols including PCI (Peripheral Component Interconnect), AGP (Accelerated Graphics Port), HyperTransport, and/or PCI-Express (PCI-E); appropriate "bridge" chips such as a north bridge and south bridge (not shown) may be provided to interconnect various components and/or buses.

Graphics processing subsystem 112 includes a graphics processing unit (GPU) 114 and a graphics memory 116, which may be implemented, e.g., using one or more integrated circuit devices such as programmable processors, application specific integrated circuits (ASICs), and memory devices. GPU 114 includes a rendering module 120, a memory interface module 122, and a scanout module 124. Rendering module 120 may be configured to perform various tasks related to generating pixel data from graphics data supplied via system bus 106 (e.g., implementing various 2D and or 3D rendering algorithms), interacting with graphics memory 116 to store and update pixel data, and the like. Rendering module 120 is advantageously configured to generate pixel data from 2-D or 3-D scene data provided by various programs executing on CPU 102. The particular configuration of rendering module 120 may be varied as desired, and a detailed description is omitted as not being critical to understanding the present invention.

Memory interface module 122, which communicates with rendering module 120 and scanout control logic 124, manages all interactions with graphics memory 116. Memory interface module 122 may also include pathways for writing pixel data received from system bus 106 to graphics memory 116 without processing by rendering module 120. The particular configuration of memory interface module 122 may be varied as desired, and a detailed description is omitted as not being critical to understanding the present invention.

Graphics memory 116, which may be implemented using one or more integrated circuit memory devices of generally conventional design, may contain various physical or logical subdivisions, such as a pixel buffer 126. Pixel buffer 126 stores pixel data for an image (or for a part of an image) that is read and processed by scanout control logic 124 and transmitted to display device 110 for display. This pixel data may be generated, e.g., from 2D or 3D scene data provided to rendering module 120 of GPU 114 via system bus 106 or generated by various processes executing on CPU 102 and provided to pixel buffer 126 via system bus 106.

Scanout module 124, which may be integrated in a single chip with GPU 114 or implemented in a separate chip, reads pixel color data from pixel buffer 118 and transfers the data to display device 110 to be displayed. In one embodiment, scanout module 124 operates isochronously, scanning out frames of pixel data at a prescribed refresh rate (e.g., 80 Hz) regardless of any other activity that may be occurring in GPU 114 or elsewhere in system 100. In some embodiments, the prescribed refresh rate can be a user selectable parameter, and the scanout order may be varied as appropriate to the display format (e.g., interlaced or progressive scan). Scanout module 124 may also perform other operations, such as adjusting color values for particular display hardware and/or generating composite screen images by combining the pixel data from pixel buffer 126 with data for a video or cursor overlay image or the like, which may be obtained, e.g., from graphics memory 116, system memory 104, or another data source (not shown). The particular configuration of scanout module 124 may be varied as desired, and a detailed description is omitted as not being critical to understanding the present invention.

During operation of system 100, CPU 102 executes various programs such as operating system programs, application programs, and driver programs for graphics processing subsystem 112. The driver programs may implement conventional application program interfaces (APIs) such as OpenGL, Microsoft DirectX or D3D that enable application and operating system programs to invoke various functions of graphics processing subsystem 112 as is known in the art. In some embodiments, the driver programs may also implement an API for leveraging the processing power of GPU 114 to perform general-purpose computations. In such embodiments, GPU 114 advantageously writes general-purpose computation results to graphics memory 116 or system memory 104, making the results accessible to CPU 102; general-purpose computation results are advantageously not scanned out to a display device by scanout module 124. Operation of graphics processing subsystem 112 may be made asynchronous with other system operations through the use of appropriate command buffers.

It will be appreciated that the system described herein is illustrative and that variations and modifications are possible. A GPU may be implemented using any suitable technologies, e.g., as one or more integrated circuit devices. The GPU may be mounted on an expansion card that may include one or more such processors, mounted directly on a system motherboard, or integrated into a system chipset component (e.g., into the north bridge chip of one commonly used PC system architecture). The graphics processing subsystem may include any amount of dedicated graphics memory (some implementations may have no dedicated graphics memory) and may use system memory and dedicated graphics memory in any combination. In particular, the pixel buffer may be implemented in dedicated graphics memory or system memory as desired. The scanout circuitry may be integrated with a GPU or provided on a separate chip and may be implemented, e.g., using one or more ASICs, programmable processor elements, other integrated circuit technologies, or any combination thereof.

In addition, GPUs embodying the present invention may be incorporated into a variety of devices, including general purpose computer systems, server computer systems, video game consoles and other special purpose computer systems, DVD players, handheld devices such as mobile phones or personal digital assistants, and so on. Further, in some embodiments, a single computer system may include multiple GPUs.

B. Execution Core

Figure 2:
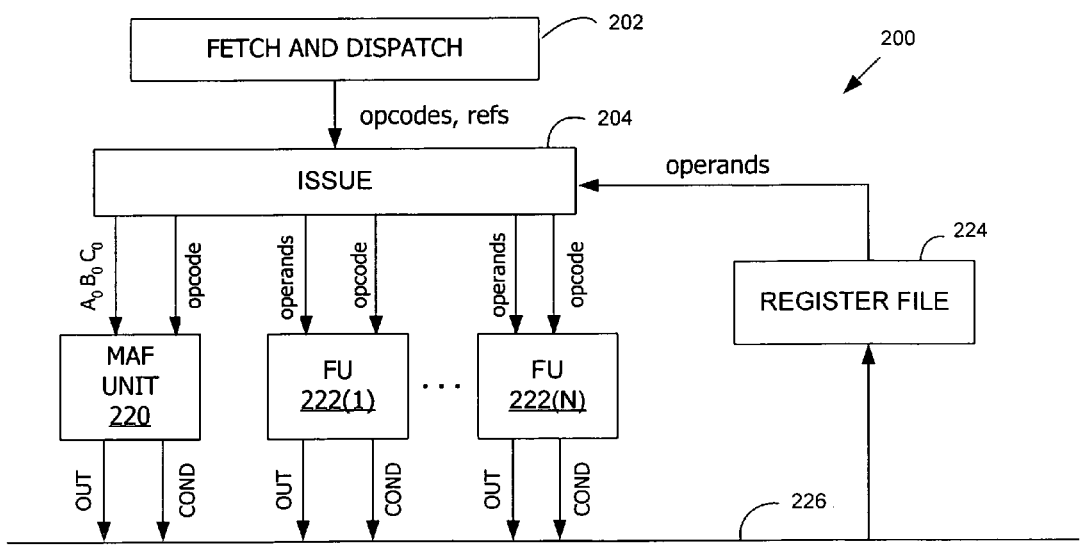
FIG. 2 is a block diagram of a portion of an execution core according to an embodiment of the present invention.

FIG. 2 is a block diagram of an execution core 200 according to an embodiment of the present invention. Execution core 200, which may be implemented, e.g., in a programmable shader unit for rendering module 120 of GPU 114 described above, is configured to execute arbitrary sequences of instructions for performing various computations. In some embodiments, the same execution core 200 can be used to execute shader programs at all phases of rendering, including vertex shader, geometry shader, and/or pixel shader programs.

Execution core 200 includes a fetch and dispatch unit 202, an issue unit 204, a multipurpose arithmetic functional (MAF) unit 220, a number (M) of other functional units (FU) 222, and a register file 224. Each functional unit 220, 222 is configured to perform specified operations. The operations performed by MAF unit 220 are described below. The other functional units 222 may be of generally conventional design and may support a variety of operations such as addition, multiplication, bitwise logic operations, comparison operations, format conversion operations, texture filtering, memory access (e.g., load and store operations), and so on.

During operation of execution core 200, fetch and dispatch unit 202 obtains instructions from an instruction store (not shown), decodes them, and dispatches them as opcodes with associated operand references or operand data to issue unit 204. For each instruction, issue unit 204 obtains any referenced operands, e.g., from register file 224. When all operands for an instruction are ready, issue unit 204 issues the instruction by sending the opcode and operands to MAF unit 220 or another functional unit 222. Issue unit 204 advantageously uses the opcode to select the appropriate functional unit to execute a given instruction. Fetch and dispatch unit 202 and issue unit 204 may be implemented using conventional microprocessor architectures and techniques, and a detailed description is omitted as not being critical to understanding the present invention.

MAF unit 220 and other functional units 222 receive the opcodes and associated operands and perform the specified operation on the operands. Result data is provided in the form of result values that can be forwarded to register file 224 (or another destination) via a data transfer path 226.

It will be appreciated that the execution core of FIG. 2 is illustrative and that variations and modifications are possible. Any number of cores may be included in a processor. Fetch and dispatch unit 202 and issue unit 204 may implement any desired microarchitecture, including scalar or superscalar architectures with in-order or out-of-order instruction issue, speculative execution modes, single-instruction, multiple dispatch (SIMD) instruction issue, and so on as desired. In some architectures, the issue unit may receive and/or issue a long instruction word that includes opcodes and operands for multiple functional units or multiple opcodes and/or operands for one functional unit. In some architectures, the execution core may include multiple instances of each functional unit operable in parallel, e.g., for execution of SIMD instructions. The execution core may also include a sequence of pipelined functional units in which results from functional units in one stage are forwarded to functional units in later stages rather than directly to a register file; the functional units in such a configuration can be controlled by a single long instruction word or separate instructions.

Additionally, persons of ordinary skill in the art with access to the present teachings will recognize that MAF unit 220 can be implemented as a functional unit in any microprocessor, not limited to graphics processors or to any particular processor or execution core architecture.

C. MAF Unit

In accordance with one embodiment of the present invention, execution core 200 includes a MAF unit 220 that executes three classes of operations: planar interpolation (PI), unary function approximation (UFA), and double-precision arithmetic. MAF unit 220 advantageously handles inputs and outputs in various floating-point and fixed-point formats, and operands for different operations can be in different formats. Before describing an embodiment of MAF unit 220, representative formats will be defined.

"Fp32", as used herein, refers to the standard IEEE 754 single-precision floating-point format, in which a normal floating point number is represented by a sign bit, eight exponent bits, and 23 significant bits. The exponent is biased upward by 127 so that exponents in the range $2^{-126}$ to $2^{127}$ are represented using integers from 1 to 254. For "normal" numbers, the 23 significant bits are interpreted as the fractional portion of a 24-bit mantissa with an implied 1 as the integer portion.

"Fp64," as used herein refers to the standard IEEE 754 double-precision floating-point format, in which a normal floating point number is represented by a sign bit, 11 exponent bits and 52 significant bits. The exponent is biased upward by 1023 so that exponents in the range $2^{-1022}$ to $2^{1023}$ are represented using integers from 1 to 2046. For "normal" numbers the 52 significant bits are interpreted as the fractional portion of a 53-bit mantissa with an implied 1 as the integer portion.

In both fp32 and fp64 formats, numbers with all zeroes in the exponent bits are referred to as denorms and are interpreted as not having an implied leading 1 in the mantissa; such numbers may represent, e.g., an underflow in a computation. The (positive or negative) number with all ones in the exponent bits and zeroes in the significant bits are referred to as (positive or negative) INF; this number may represent, e.g., an overflow in a computation. Numbers with all ones in the exponent bits and a non-zero number in the significant bits are referred to as Not a Number (NaN) and may be used, e.g., to represent a value that is undefined. Zero is also considered a special number and is represented by all of the exponent and significant bits being set to zero.

Fixed-point formats are specified herein by an initial "s" or "u" indicating whether the format is signed or unsigned and a number denoting the total number of bits (e.g., 4, 13); thus, s13 refers to signed 13-bit format, u4 to an unsigned four-bit format and so on. For the signed formats, two's complement negation is advantageously used. In all formats used herein, the most significant bit (MSB) is at the left of the bit field and the least significant bit (LSB) is at the right.

It is to be understood that these formats are defined and referred to herein for purposes of illustration and that a MAF unit might support any combination of these formats or different formats without departing from the scope of the present invention. In particular, it is to be understood that "single-precision" and "double-precision" can refer to any two different floating-point formats, not limited to currently defined standards; a double-precision format (e.g., fp64) refers to any format that uses a larger number of bits than a related single-precision format (e.g., fp32) to represent a larger range of floating-point numbers and/or to represent floating-point values to a higher degree of precision.

An embodiment of MAF unit 220 according to the present invention will now be described. FIG. 3 lists unary function approximation (UFA) operations, planar interpolation (PI) operations, and double-precision arithmetic operations that can be performed by this embodiment of MAF unit 220.

UFA operations (listed at 302) include a variety of algebraic and transcendental functions $f(x)$ that can be computed using a polynomial approximation, such as trigonometric functions (SIN, COS), exponential (EXP), logarithm (LOG), reciprocal (RCP), and reciprocal square root (RSQ). It is to be understood that MAF unit 220 may support any combination of unary functions, not limited to those listed in FIG. 3.

In one embodiment, MAF unit 220 executes each UFA operation by computing a polynomial approximation of the form:

$$f(x) \approx F_2(x_b)*x_h^2 + F_1(x_b)*x_h + F_0(x_b), \quad \text{(Eq. 1)}$$

where $x_b$ is a "baseline" value that is close to x and $x_h$ is the difference between $x_b$ and x. A finite number of base values $x_b$ is selected, and for each $x_b$, a set of coefficients $F_2$, $F_1$, $F_0$ is determined. Different unary functions $f(x)$ will generally have different coefficients $F_2$, $F_1$, $F_0$ for a given $x_b$, and may also use different values of $x_b$. Numerous techniques for determining coefficients for polynomial approximations to functions are known in the art; examples are described in above-referenced application Ser. No. 10/861,184.

MAF unit 220 advantageously includes lookup tables (LUTs) or other data storage circuits that are pre-loaded with sets of values of $F_2(x_b)$, $F_1(x_b)$ and $F_0(x_b)$ for each supported UFA operation. MAF unit 220 also includes multiplier and adder circuits arranged to compute Eq. 1. When a UFA operation is executed, the coefficients are retrieved from the lookup tables based on the operand x, and the computation is performed.

To reduce the size of the lookup tables for a given UFA operation, argument reduction is advantageously applied to operand x before operand x is supplied to MAF unit 220. Argument reduction (also referred to as range reduction) is well known in the art and refers generally to limiting the argument x of a function to some bounded interval. For example, the functions sin x and cos x are both periodic with period $2\pi$. Thus, sin x for arbitrary x can be computed by reducing the argument x according to $x=x_0+2\pi K$, where K is an integer and $0 \leq x_0 < 2\pi$, then computing sin $x_0$=sin x. In some implementations, the reduced argument $x_0$ is specified as a fraction $x_R=x_0/2\pi$, where $0 \leq x_R < 1$. Similarly, the reciprocal of an operand x can be computed by expressing x as $x_R*2^E$, where $1 \leq x_R < 2$. The reciprocal of $2^E$ is just $2^{-E}$, and the reciprocal of a reduced operand $x_R$ can be computed using lookup tables that cover just the interval [1, 2). (The reciprocal of x will always have the same sign as x, so it is not necessarily to consider negative x values separately.)

Section 302 of FIG. 3 summarizes the ranges and input formats for the UFA operations supported by MAF unit 220 in this embodiment. Argument reduction can be implemented in a separate functional unit from MAF unit 220, with the result of the argument reduction operation being provided to MAF unit 220. Argument reduction techniques for each operation listed in section 302 are known in the art; for purposes of the present description, it is assumed that MAF unit 220 receives arguments (operand x) in reduced form. For some operations, post-processing (in the form of scaling by a power of 2) is applied as shown in FIG. 3. Such post-processing may be implemented in circuits other than MAF unit 220; such circuits can be of conventional design, and a detailed description of this post-processing is omitted.

In addition to UFA operations, MAF unit 220 also supports two planar interpolation (PI) operations, listed at section 304 in FIG. 3. "IPA" denotes planar attribute interpolation without perspective correction, and "IPAW" denotes planar attribute interpolation with perspective correction.

In general, planar interpolation for an attribute U in an (x, y) plane involves computing a function of the form:

$$U(x,y)=A*x+B*y+C, \quad \text{(Eq. 2)}$$

where A, B and C are interpolation parameters associated with attribute U. As is known in the art, in graphics applications, attributes such as color, texture and so on are usually specified for vertices of primitives that make up a scene to be rendered. These attributes are interpolated in the (x, y) screen plane as needed to determine the color of pixels covered by the primitive. The graphics processor typically includes a circuit configured to compute interpolation parameters A, B, and C; the details of such computations are not relevant to the present invention. In the embodiments described herein, MAF unit 220 receives as operands a set of previously computed interpolation parameters A, B, and C and the coordinates (x, y) for a fragment and computes Eq. 2.

In some embodiments, MAF unit 220 is capable of performing attribute interpolation for multiple sample locations (x, y) in parallel. For example, FIG. 4 illustrates a quad 400 consisting of four fragments 401-404 that meet at a quad center 410, which has coordinates $(x_c, y_c)$. Sample points 411-414 in fragments 401-404 are defined by coordinate offsets relative to $(x_c, y_c)$; thus, sample point 411 is offset by $(dx_0, dy_0)$, sample point 412 by $(dx_1, dy_1)$ and so on. For a sample point with index i (i=0, 1, 2, 3), Eq. 2 above yields:

$$U(x_i,y_i)=A*(x_c+dx_i)+B*(y_c+dy_i)+C=A*x_c+B*y_c+\Delta_i' \quad \text{(Eq. 3)}$$

where:

$$\Delta_i=A*dx_i+B*dy_i+C. \quad \text{(Eq. 4)}.$$

In embodiments described herein, quad center coordinates $(x_c, y_c)$ are integers in s13 format, and the coordinate offsets $(dx_i, dy_i)$ are fractions restricted to the interval (−1, 1). Using Eqs. 3 and 4, MAF unit 220 can be configured to compute interpolated attributes $U(x_i, y_i)$ in parallel for a number of sample locations i; one such embodiment that supports up to four sample locations is described below. In some embodiments, coordinate offsets $(dx_i, dy_i)$ are specified as unsigned values in u4 format with index i determining the signs: e.g., for i=0, the signs are (−, −); for i=1, (−, +) and so on. In other embodiments, coordinate offsets $(dx_i, dy_i)$ may include sign bits and may be in s5 format or another signed integer format.

The IPA and IPAW operations in FIG. 3 differ from each other in that, for IPAW, perspective correction is applied to the interpolated attribute U. As is known in the art, perspective can be modeled using homogeneous coordinates (x, y, w) defined such that coordinates (λx, λy, λw) for all λ≠0 map to the same 2-D coordinates. An attribute value u=U/w is provided for each vertex of the primitive. For perspective correct interpolation, the WA operation can be used to interpolate (1/w) as an attribute (using Eq. 2 or Eq. 3). An interpolated perspective parameter w' is determined by computing the reciprocal of interpolated (1/w). The attribute u is interpolated (again using Eq. 2 or Eq. 3) to obtain $u_0$, and the perspective-correct attribute U is determined by multiplying $u_0*w'$. Thus, IPA and IPAW operations differ in that IPAW includes an extra multiplication.

MAF unit 220 is advantageously configured to compute Eq. 1 (for unary functions) and Eq. 3 (for planar interpolation) using the same multiplier and adder circuits. Specifically, Eqs. 1, 2 and 3 all have the same general form:

$$\text{Result}=M2*\mu2+M1*\mu1+M0. \quad \text{(Eq. 5)}$$

In MAF unit 220, this similarity is exploited by configuring the same multipliers and adders to compute Eq. 1 or Eq. 3, depending on whether the opcode received from issue circuit 204 designates a UFA or PI operation.

In addition to UFA and PI operations, MAF unit 220 also supports double-precision arithmetic operations listed at section 306 of FIG. 3. A double-precision addition (DADD) operation computes the sum of two double-precision inputs (α and β), and a double-precision multiply (DMUL) operation computes the product of double-precision inputs α and β.

DMUL operations are advantageously implemented using the same multipliers and adders used in computing Eq. 5. Where the multipliers are smaller than the size required to multiply two double-precision mantissas (e.g., 53×53 bits for fp64), MAF unit 220 generates the product by executing multiple partial multiplications sequentially. Herein, multiplier "size" refers to the maximum number of multiplicand and multiplier bits that the multiplier can process; size can be expressed in the form s1×s2, where s1 (multiplicand size, or "width") and s2 (multiplier size, or "height") need not be equal.

Figure 5:
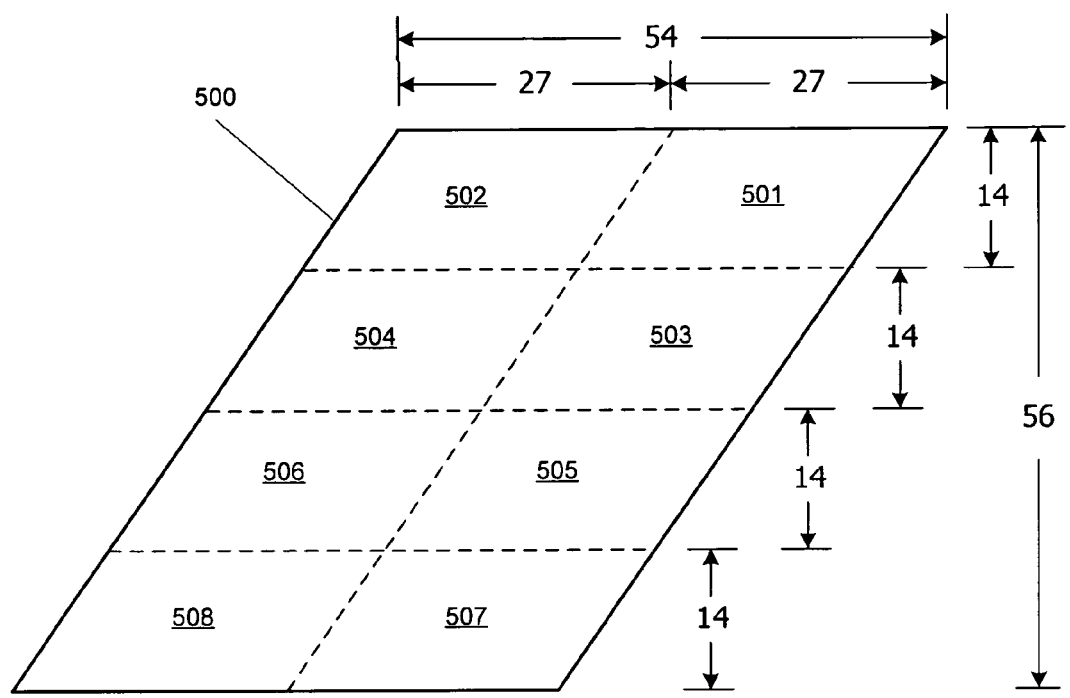
FIG. 5 illustrates an operating principle of the present invention related to double-precision multiplication.

FIG. 5 illustrates an operating principle of the present invention. A parallelogram 500 represents partial products for a multiplication of a 54-bit multiplicand by a 56-bit multiplier. It is to be understood that parallelogram 500 represents 56 rows containing 54 bits each, with each row being left-shifted by 1 bit relative to the row immediately above (the trailing zeroes introduced by left-shifting are suppressed). Each row is a partial product of the multiplicand and one of the bits of the multiplier. The final product is generated by adding the partial products.

In FIG. 5, parallelogram 500 is subdivided into eight sub-parallelograms 501-508, each of which represents a partial product for a multiplication of a 27-bit multiplicand by a 14-bit multiplier. If the eight sub-products represented by sub-parallelograms 501-508 are computed and the respective results added with appropriate offsets, the 54-by-56 product can be determined.

Some embodiments of the present invention exploit this property. As described below, one embodiment of MAF unit 220 includes two 27×17 multipliers operable in parallel that are used to compute products $M1*\mu1$ and $M2*\mu2$ of Eq. 5 for UFA and PI operations, as well as to compute the eight sub-multiplications represented in FIG. 5 for DMUL operations. The multiplier (e.g., operand β) is subdivided into four sections ($\beta_0, \beta_1, \beta_2, \beta_3$) of 14 bits each; for fp64, the leading three bits in section $\beta_3$ are set to zero since the mantissa has only 53 bits. The multiplicand (e.g., operand α) is subdivided into two sections ($\alpha_H, \alpha_L$) of 27 bits each; for fp64, the leading bit in section $\alpha_H$ is set to zero. On each of four successive iterations i (where i=0, 1, 2, 3), one of the two 27×17 multipliers is used to multiply $\alpha_H*\beta_i$ while the other of the 27×17 multipliers is used to multiply $\alpha_L*\beta_i$.

An addition block used in computing Eq. 5 for UFA and PI operations is advantageously used as an accumulator. On each iteration, the addition block adds the two new sub-products (with appropriate offsets) to a running total until the complete product is generated. FIGS. 6A-6D illustrate stages in the accumulation process. Each 27×14 multiplication produces a 41-bit sub-product. At each cycle, two 41-bit sub-products are produced, with a 27-bit offset relative to each other (since $\alpha_L$ is 27 bits). The sub-products are accumulated in a running sum until the complete product is formed.

Figure 6A:
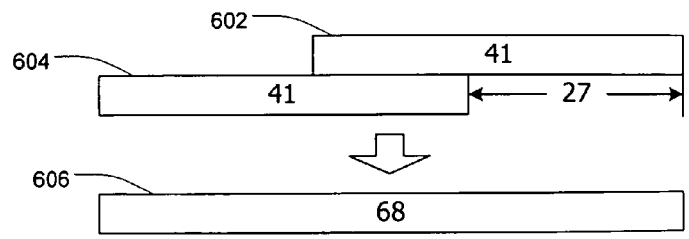
FIGS. 6A-6D illustrate an operating principle of the present invention related to an accumulation process for double-precision multiplication.

More specifically, in FIG. 6A, bit field 602 represents the sub-product $\alpha_L*\beta_1$ (corresponding to sub-parallelogram 501 in FIG. 5), and bit field 604 represents the sub-product $\alpha_H*\beta_0$ (corresponding to sub-parallelogram 502). The sum of bit fields 602 and 604 is represented as a 68-bit first-iteration running sum field 606. It should be noted that because of the 27-bit relative offset, only 14 of the 68 bits require actual addition.

Figure 6B:
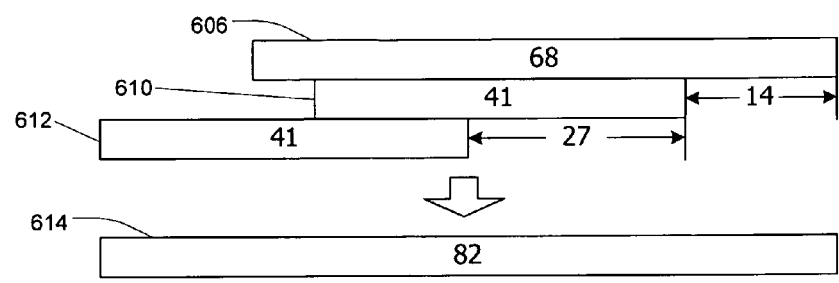

In FIG. 6B, bit field 608 represents the sub-product $\alpha_L*\beta_1$ (corresponding to sub-parallelogram 503 in FIG. 5), and bit field 610 represents the sub-product $\alpha_H*\beta_1$ (corresponding to sub-parallelogram 504 in FIG. 5). The sum of first-iteration running sum field 606 with the new sub-products 608 and 604 is represented as an 82-bit second-iteration running sum field 612. The 14-bit relative offset between fields 606 and 610 corresponds to the offset between $\beta_0$ and $\beta_1$. Because of the various offsets, only 54 of the 82 bits require actual addition.

Figure 6C:
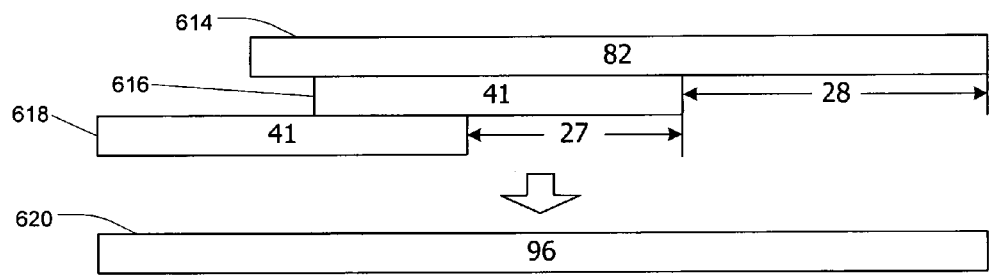

In FIG. 6C, bit field 614 represents the sub-product $\alpha_L*\beta_2$ (corresponding to sub-parallelogram 505) and bit field 616 represents the sub-product $\alpha_H*\beta_2$ (corresponding to sub-parallelogram 506). The sum of second-iteration running sum field 612 with the new sub-products 614 and 616 is represented as a 96-bit third-iteration running sum field 618. The 28-bit relative offset between fields 612 and 614 corresponds to the offset between $\beta_0$ and $\beta_2$. Because of the various offsets, only 54 of the 96 bits require actual addition.

Figure 6D:
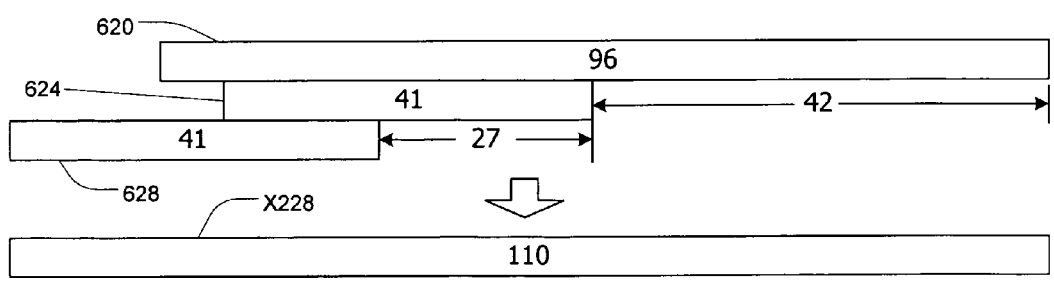

In FIG. 6D, bit field 620 represents the sub-product $\alpha_L*\beta_3$ (corresponding to sub-parallelogram 507) and bit field 622 represents the sub-product $\alpha_H*\beta_3$ (corresponding to sub-parallelogram 508). The sum of third-iteration running sum field 618 with the new sub-products 620 and 622 is represented as a 110-bit fourth-iteration running sum (final result) field 624. The 42-bit relative offset between fields 618 and 620 corresponds to the offset between $\beta_0$ and $\beta_3$. Because of the various offsets, only 54 of the 110 bits require actual addition.

It should also be noted that it is not necessary to preserve (or even to compute) all 110 bits of final result 624. In the case of fp64, the mantissa is 53 bits and trailing bits will be discarded after rounding. In some embodiments, after each iteration, the result is truncated by reducing the last 14 bits to a single sticky bit, e.g., using a conventional OR-reduction, leaving 54 bits plus a guard bit to be used in rounding. In such embodiments, an 68-bit adder is sufficiently wide to accommodate all of the addition operations depicted in FIGS. 6A-6D.

DADD operations are advantageously implemented using the same addition block used in computing the running sum during DMUL operations to add the mantissas of the two operands, as described below.

Sections II and III describe a MAF unit 220, with Section II describing a circuit structure for MAF unit 220, and Section III describing how that circuit structure can be used to execute the operations listed in FIG. 3. It is to be understood that the MAF unit 220 described herein is illustrative and that other or different combinations of functions might be supported using appropriate combinations of circuit blocks.

II. Example MAF Unit Structure

Figure 7A:
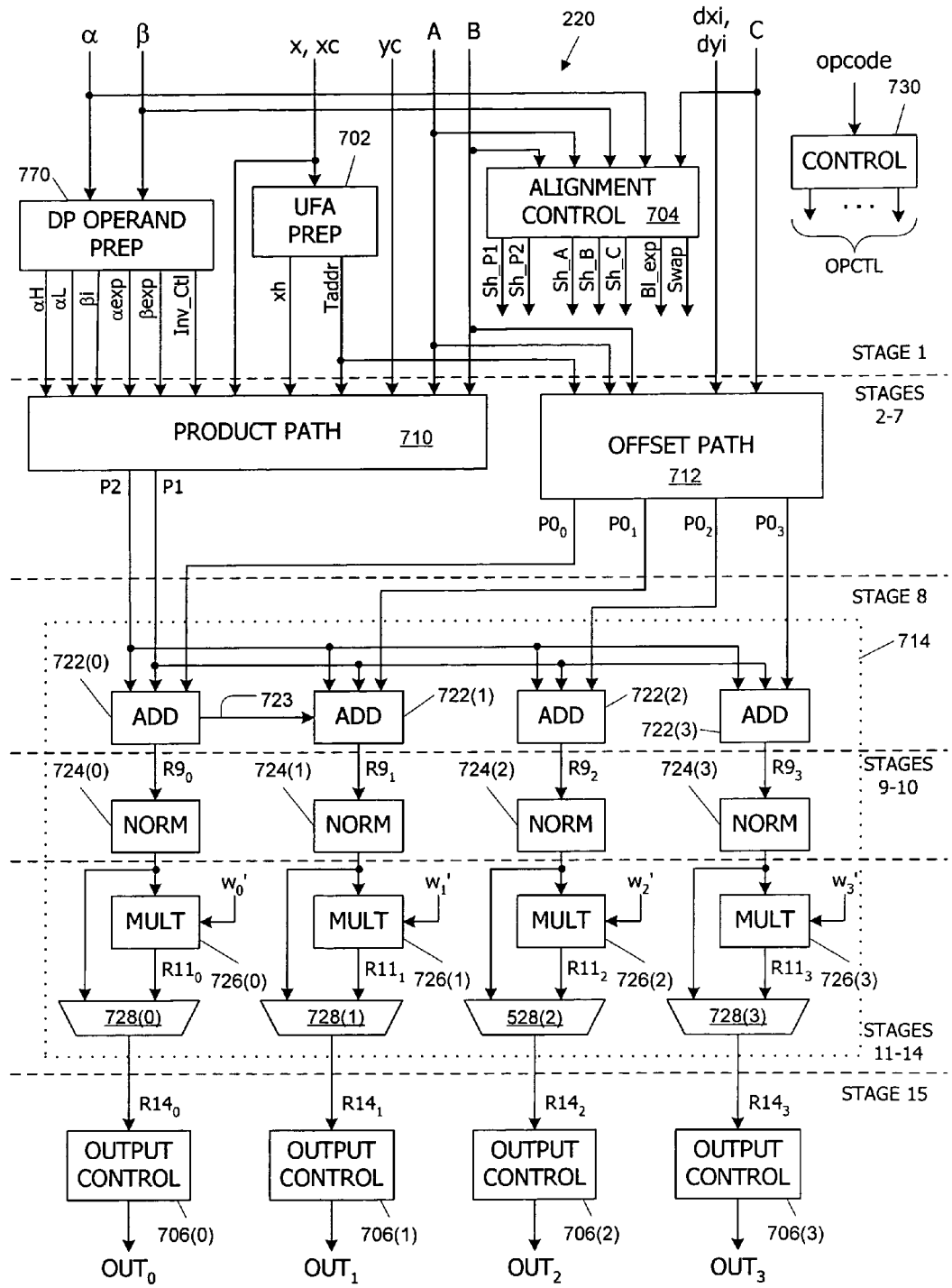
FIG. 7A is a high-level block diagram of a multipurpose arithmetic functional unit according to an embodiment of the present invention.

FIG. 7A is a high-level block diagram of a MAF unit 220 according to an embodiment of the present invention. In this embodiment, MAF unit 220 implements a fifteen-stage pipeline that is used for all operations. On each processor cycle, MAF unit 220 can receive (e.g., from issue circuit 204 of FIG. 2) an opcode and appropriate operands. For a unary function, operand x is provided in a reduced format (see FIG. 3) that includes 24 bits. For a planar interpolation function, operands $(x_c, y_c)$, are provided in s13 format, operands A, B, C are provided in fp32 format, and four pixel offsets $(dx_0, dy_0)$; $(dx_1, dy_1)$; $(dx_2, dy_2)$; $(dx_3, dy_3)$ are provided in u4 or s5 format. For a double-precision arithmetic function, operands $\alpha$ and $\beta$ are provided in fp64 format.

MAF unit 220 processes each operation through all of the pipeline stages 1-15 and produces four result values ($OUT_0$-$OUT_3$) that are propagated to data transfer path 226 (FIG. 2). In one embodiment, each stage corresponds to a processor cycle; in other embodiments, elements shown in one stage may be split across multiple processor cycles or elements from two (or more) stages may be combined into one processor cycle. As described below, double-precision arithmetic entails multiple iterations through some of the pipeline stages.

In the case of PI operations, the four result values $OUT_0$-$OUT_3$ are attribute values at each of four pixels in a quad. In the case of double-precision arithmetic operations, a single result is provided on one path (e.g., $OUT_1$) as described below. In the case of UFA operations, the four result values may be results of four different operations, or all four results may be the same, or only one result path might be active. In one embodiment, issue circuit 204 can simultaneously issue multiple UFA instructions, each with its own operand. As described below, sequencing logic can be used to deliver these instructions sequentially to MAF unit 220, collect the results, and deliver a complete set of collected results onto data transfer path 226. Results on data transfer path 226 may be propagated, e.g., to register file 224 as shown in FIG. 2 and/or to other elements of a processor core, depending on the architecture.

Section II.A provides an overview of the MAF pipeline, and Sections II.B-G describe the circuit blocks of each stage in detail.

A. MAF Pipeline

In MAF unit 220 as shown in FIG. 7A, pipeline stage 1 can be regarded as an input section and stage 15 as an output section. Stage 1 includes a unary function approximation (UFA) operand preparation block 702 that, for unary functions, separates operand x into index bits ($x_b$) and offset bits ($x_h$) as described below. Stage 1 also includes an alignment logic block 704 that generates alignment signals (Sh_P1, Sh_P2, Sh_A, Sh_B, Sh_C, B1_exp and Swap) used to align values that are to be added, as described below. Stage 1 also includes a double-precision (DP) operand preparation block 770 that, for double-precision arithmetic operations (DADD and DMUL), separates the operands into mantissa and exponent parts and delivers these parts to the product path as described below.

Stage 15 includes four output control blocks 706 that format the final result for distribution. Output control blocks 706 include control logic for generating special number outputs in the event of overflows, underflows, or special number inputs.

Between stages 1 and 15, MAF unit 220 includes a "product path" 710, a "pixel offset path" 712 and an "addition path" 714 (dotted box). While these names may suggest particular functions, it will become apparent that circuit blocks along the various paths can be leveraged in different ways depending on the operation being performed.

Figure 7B:
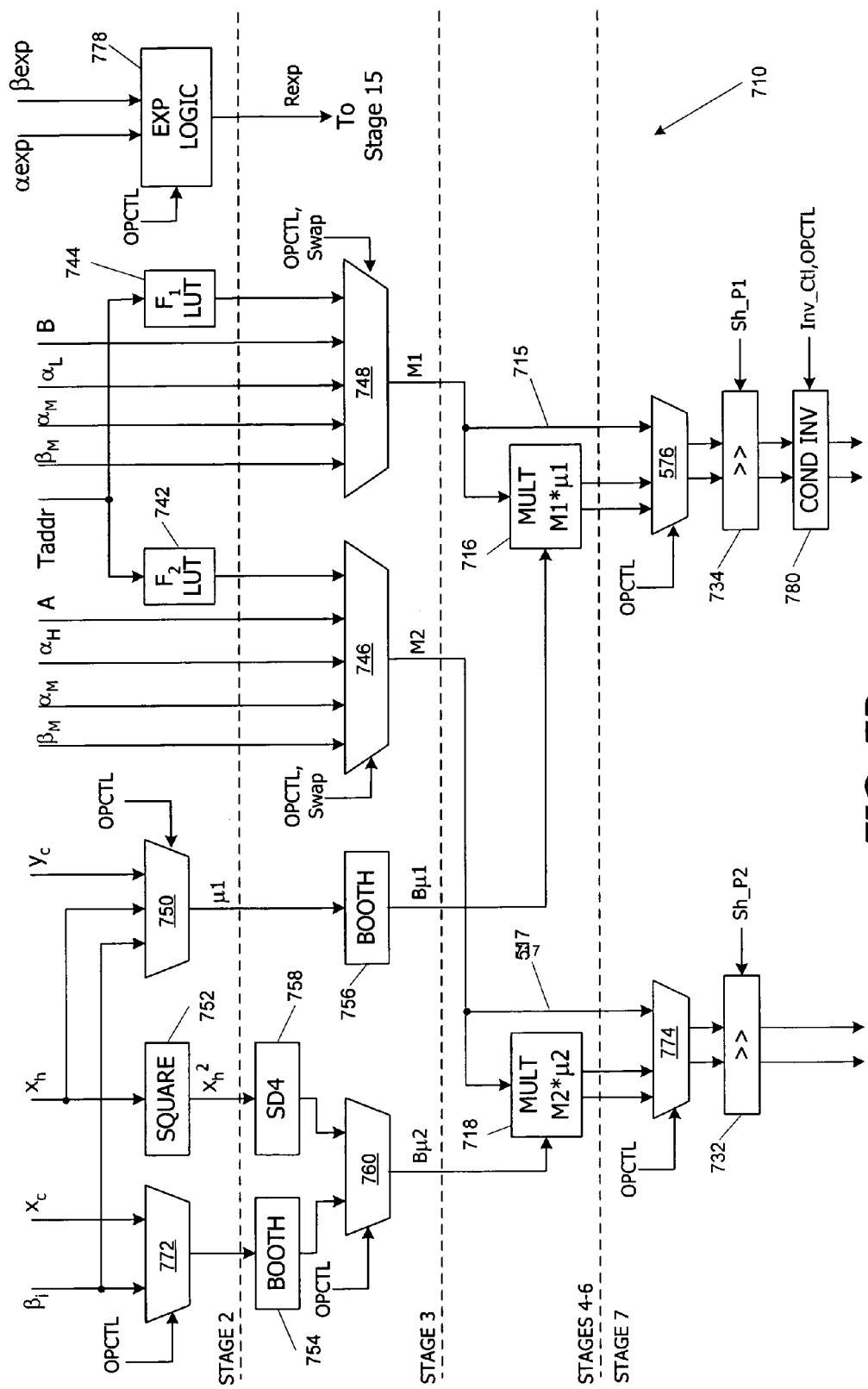
FIG. 7B is a block diagram of a product path for the multipurpose arithmetic functional unit of FIG. 7A.

FIG. 7B is a block diagram of product path 710, also referred to herein as a product pipeline, according to an embodiment of the present invention. Product path 710 includes multiplier blocks 716, 718 for computing products P1=M1*μ1 and P2=M2*μ2 (in the generalized notation of Eq. 5), as well as associated selection circuitry for selecting and encoding an appropriate multiplier (μ) and multiplicand (M) for each product based on the operation. Specifically, for PI operations, M2=A, μ2=$x_c$, M1=B, and μ1=$y_c$. For UFA operations, M2=$F_2(x_b)$, μ2=$x_h^2$, M1=$F_1(x_b)$, and μ1=$x_h$, where $x_b$ and $x_h$ are derived from operand x by UFA preparation block 702. For DMUL operations, M2=$\alpha_H$ (the 26 most significant bits (MSBs) of the mantissa of operand $\alpha$, with a leading 0 prepended), M1=$\alpha_L$, (the 27 least significant bits (LSBs) of the mantissa of operand $\alpha$), and $\mu2=\mu1=\beta_i$ (14 bits from the mantissa of operand $\beta$, selected sequentially as described below). For DADD operations, M2 is the mantissa of the larger one of operands $\alpha$ and $\beta$, as determined by alignment logic block 704, while M1 is the mantissa of the smaller operand. In other embodiments, different permutations of the multipliers and multiplicands may be selected; for example, the multiplier and multiplicand for an operation might be reversed. The components of product path 710 are described further in Section II.C.

Figure 7C:
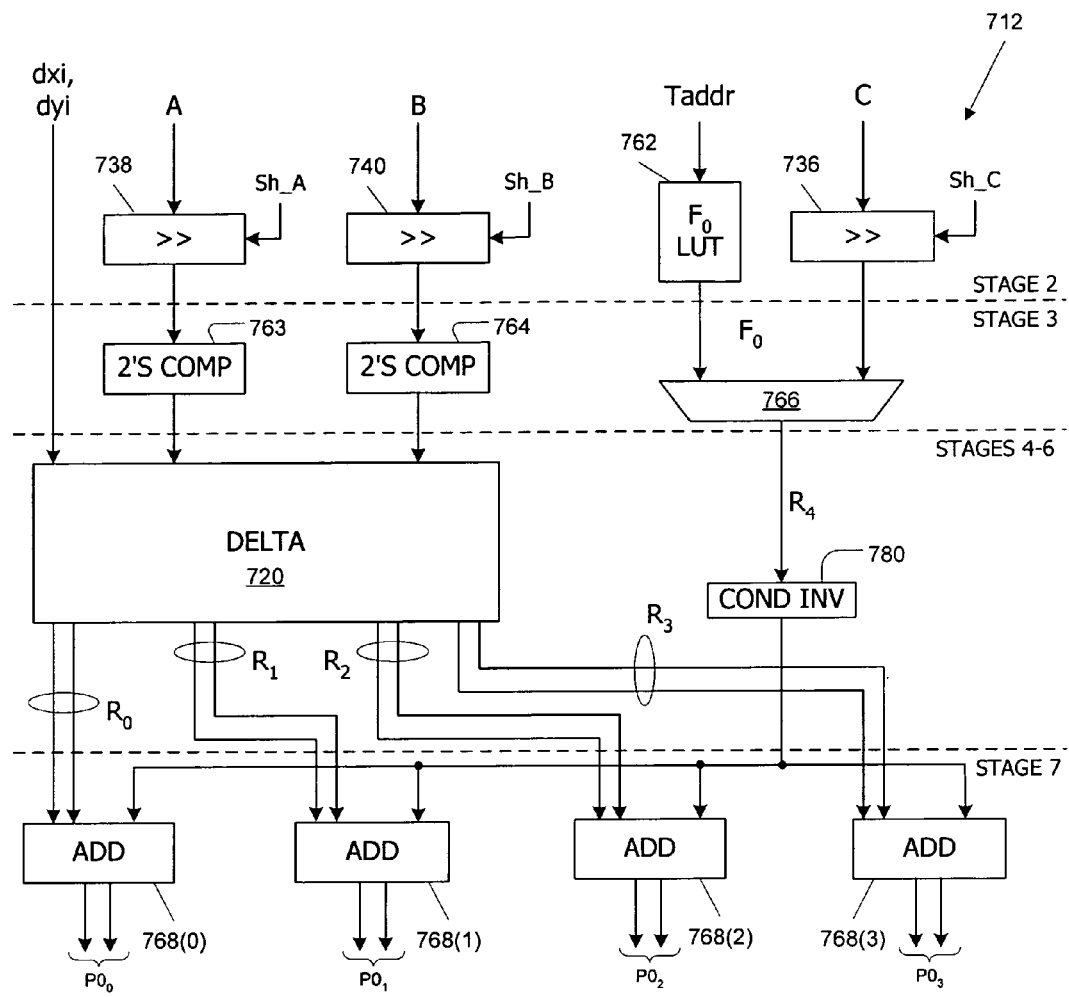
FIG. 7C is a block diagram of an offset path for the multipurpose arithmetic functional unit of FIG. 7A.

FIG. 7C is a block diagram of pixel offset path 712, also referred to herein as an offset path or offset pipeline, according to an embodiment of the present invention. Offset path 712 includes a "delta" block 720 and associated circuitry that, during a PI operation, computes $P0_i=\Delta_i$ (where $\Delta_i$ is given by Eq. 4 above) for each received pixel offset ($dx_i$, $dy_i$), where i=0, 1, 2, 3. During a UFA operation, the circuits in pixel offset path 712 compute a coefficient $P0=F_0(x_b)+b_0$, where $b_0$ is a function-specific rounding bias as described in above-referenced application Ser. No. 10/861,184. (In some embodiments, the rounding bias $b_0$ may be omitted.) Pixel offset path 712 supplies four $P0_i$ values, which can be different from each other, to addition path 714. The components of offset path 712 are described further in Section II.D.

Addition path 714 (dotted box in FIG. 7A), also referred to herein as an addition pipeline, includes four parallel sets of add blocks 722, normalization blocks 724, and multiply blocks 726. (Multiple instances of like objects are denoted herein by a reference number followed by a parenthetical instance identifier where appropriate.) Each pipeline receives the products P1 and P2 from product path 710 and a respective one of the four $P0_i$ values from pixel offset path 712. Add blocks 722 each compute a sum $P2+P1+P0_i$ during stages 7 and 8, producing results $R8_i$. At least one of add blocks 722 (e.g., block 722(0)) is also operable in an accumulation mode during DMUL operations, as described below. In some embodiments, add block 722(0) can supply a result as input data to add block 722(1) via a path 723 during double-precision arithmetic operations as described below.

Normalization blocks 724 normalize the results $R8_i$ in stages 9 and 10, producing results $R9_i$. In stages 11-14, multiplier blocks 726 may be used to apply perspective correction by multiplying the results $R9_i$ by the interpolated perspective parameter w', or they may be bypassed via multiplexers 728 if perspective correction is not desired.

In addition to these data paths, MAF unit 220 also provides a control path, represented in FIG. 7A by a control block 730 in stage 0. Control block 730 receives the opcode and generates various opcode-dependent control signals, denoted generally herein as "OPCTL," that can be propagated to each circuit block in synchronization with data propagation through the pipeline. (The connection of OPCTL signals into the various circuit blocks is not shown in FIG. 7A.) As described below, OPCTL signals can be used to enable, disable, and otherwise control the operation of various circuit blocks of MAF unit 220 in response to the opcode so that different operations can be performed using the same pipeline elements. The various OPCTL signals referred to herein can include the opcode itself or some other signal derived from the opcode, e.g., by combinatorial logic implemented in control block 730. In some embodiments, control block 730 may be implemented using multiple circuit blocks in several pipeline stages. It is to be understood that the OPCTL signals provided to different blocks during a given operation may be the same signal or different signals. In view of the present disclosure, persons of ordinary skill in the art will be able to construct suitable OPCTL signals.

It should be noted that the circuit blocks for a given stage may require different amounts of processing time and that the time required at a particular stage might vary from one operation to another. Accordingly, MAF unit 220 may also include various timing and synchronization circuits (not shown in FIGS. 7A-7C) to control propagation of data on different paths from one pipeline stage to the next. Any appropriate timing circuitry (e.g., latches, transmission gates, etc.) may be used.

B. Elements in Stage 1

Pipeline stage 1 includes UFA preparation block 702, alignment control block 704, and DP preparation block 770.

Figure 8A:
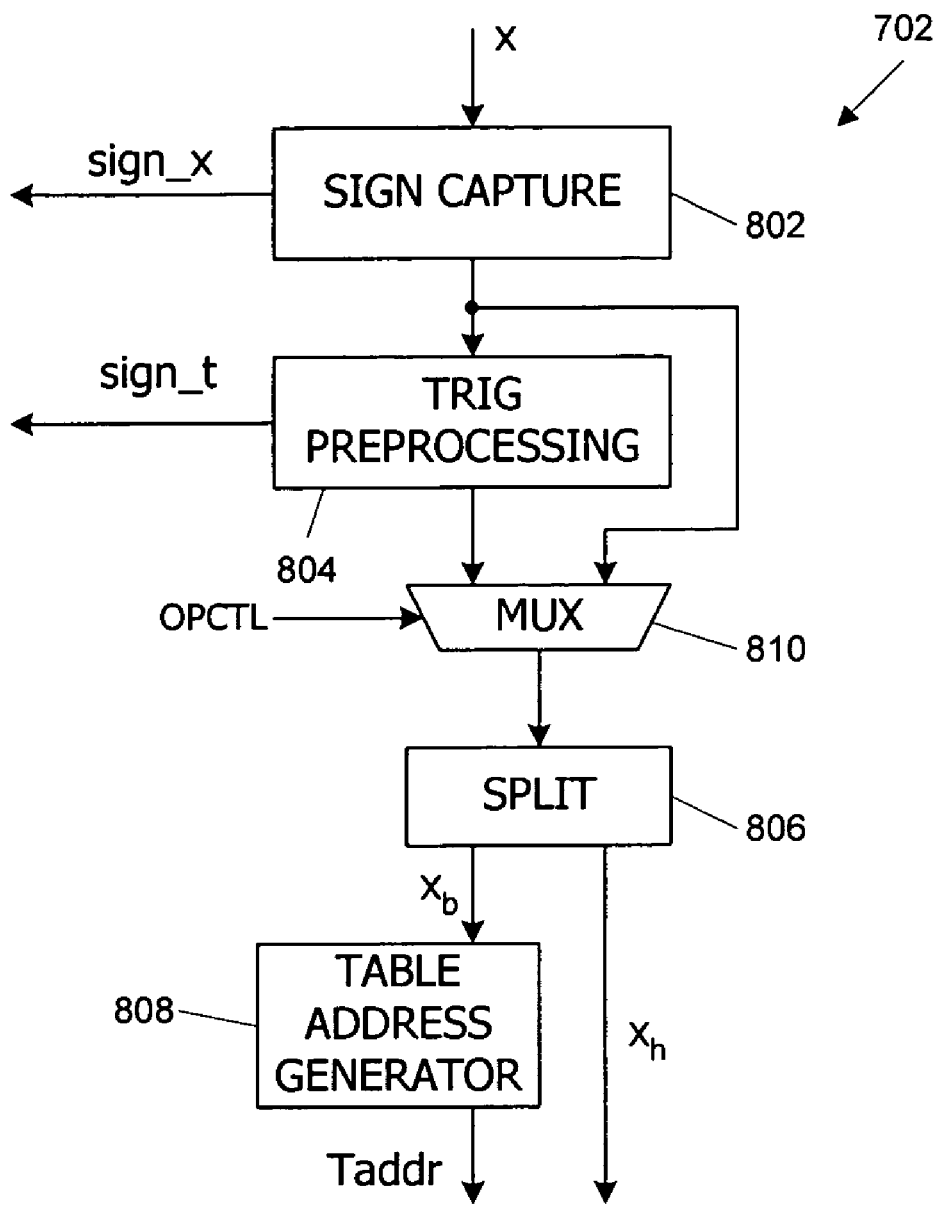
FIG. 8A is a block diagram of an operand preparation block for unary function approximation operations in the multipurpose arithmetic functional unit of FIG. 7A.

FIG. 8A is a block diagram of UFA preparation block 702, which includes a sign capture block 802, a trig preprocessing circuit 804, a splitting circuit 806, a table address generator 808, and selection multiplexer (mux) 810. For UFA operations, UFA preparation block 702 generates an index for lookup tables that can be used to extract the coefficients $F_2$, $F_1$, $F_0$ (see Eq. 1 above) and an offset value $x_h$. Specifically, sign capture block 802 extracts the sign bit (e.g., the first bit) of operand x and generates a corresponding sign_x signal that is advantageously provided to downstream components for which sign information is required, notably output control blocks 706 in stage 15 (FIG. 7).

Splitting circuit 806 receives an operand x that has 24 mantissa bits (the implied leading 1 can be inserted for fp32 inputs as appropriate) and separates the mantissa bits into m MSBs ($x_b$) and 24−m LSBs ($x_h$). The value of m may be controlled so that different values are used for different unary functions. The MSBs ($x_b$) correspond to a baseline value for the polynomial approximation of Eq. 1 above, and the LSBs ($x_h$) correspond to the offset. As described above, MAF unit 220 advantageously operates on reduced arguments. Except in the case of logarithm operations (described below), exponent bits in operand x are not relevant.

Table address generation circuit 808 uses the baseline value $x_b$, to determine a table address (Taddr) for coefficient lookup tables. In one embodiment, a physically separate lookup table is provided for each supported unary function, and table address Taddr may be just $x_b$. In other embodiments, some or all of the lookup tables are physically combined but logically separate, and Taddr is computed based on the opcode as well as $x_b$ (e.g., by adding an opcode-dependent offset to the baseline value $x_b$). In one embodiment, the lookup tables are implemented such that one address Taddr returns all three coefficients $F_2$, $F_1$, $F_0$ for a function; in other embodiments, table address generation circuit 808 may be configured to provide a different address Taddr for each coefficient.

In some embodiments, UFA preparation block 702 also includes trig preprocessing circuit 804, which performs further operand processing in the case of trigonometric UFA operations (e.g., sine and cosine) and is bypassed by selection mux 810 for all other functions. Specifically, trig preprocessing circuit 804 performs a "quadrant reduction" on operand x. As noted above, for SIN and COS operations, the operand is advantageously provided as a fraction $x_R$ in the interval [0, 1). As is well known, sine and cosine functions have a quadrant symmetry such that sin x=sin($\pi$−x), cos x=−cos($\pi$−x), and so on. Thus, if $x_R$ is not in the first quadrant (i.e., range [0, 1/4]), sin x or cos x can be computed by determining the sine or cosine of either x or an appropriate supplement of x that is in the first quadrant and choosing the correct sign based on the quadrant of $x_R$. The quadrant of $x_R$ can be determined by examining the two leading bits of the fraction and an appropriate transformation applied, based on the quadrant and whether sine or cosine is being computed. The appropriate sign for the result, which is determined from the quadrant, is propagated on a sign_t signal line. Suitable trig preprocessing circuits are known in the art.

Referring again to FIG. 7A, alignment control block 704 determines the relative alignment for the terms P0, P1, P2. In the case of UFA operations, coefficients $F_2$, $F_1$, $F_0$ are all represented as fixed-point numbers, but operand x is generally a floating-point number with a nonzero exponent, which may require applying a nonzero shift in P2 and/or P1 due to the effect of squaring $x_h$. Alignment control block 704 generates suitable control signals Sh_P2 and Sh_P1 that are applied by shift circuits 732 and 734 at the end of product path 710.

In the case of PI operations, coordinates $x_c$ and $y_c$ are in a fixed-point format, but interpolation parameters A, B, and C are in a floating-point format (e.g., fp32) and may have different orders of magnitude; consequently, alignment shifting of any two of P2, P1, and P0 prior to addition may be needed. Alignment control block 704 generates suitable control signals Sh_P2 and Sh_P1 that are applied by shift circuits 732 and 734 at the end of product path 710 and also generates a control signal Sh_C that is applied to parameter C by shift circuit 736 in pixel offset path 712. Further, the pixel offset computations in delta block 720 may also require alignment shifting; this alignment is achieved by shifting parameters A and B using shift circuits 738, 740 in pixel offset path 712, under the control of Sh_A and Sh_B signals generated by alignment control block 704. Conventional techniques (e.g., exponent comparison) for determining alignment shift amounts may be used.

In some embodiments, alignment shift amounts for planar interpolation operations may be determined upstream of MAF unit 220. For example, in the case of fragment attributes in graphics applications, it is often the case that the same interpolation parameters A, B, C apply to multiple fragments. For efficiency, the shift amounts can be computed elsewhere (e.g., in the same module that generates parameters A, B, C for the attribute) and provided as inputs to MAF unit 220 along with operands A, B, and C.

Alignment control block 704 also determines the relative alignment of the operands for double-precision addition (DADD) operations. In one embodiment, alignment control block 704 subtracts the respective 11-bit exponents of double-precision operands α and β. The sign of the difference is used to identify the larger of the two exponents, which is supplied as a block exponent (B1_exp) to subsequent stages as described below. The sign of the difference is also used to generate a swap control (Swap) signal that is used to steer operands α and β onto appropriate paths as described below. The magnitude of the difference is provided as shift control signal Shift_P1.

For double-precision multiplication (DMUL) operations, alignment control block 704 sets the Sh_P2 control signal to zero and the Sh_P1 control signal to 27, to provide a 27-bit relative offset between the sub-products generated in each iteration.

Figure 8B:
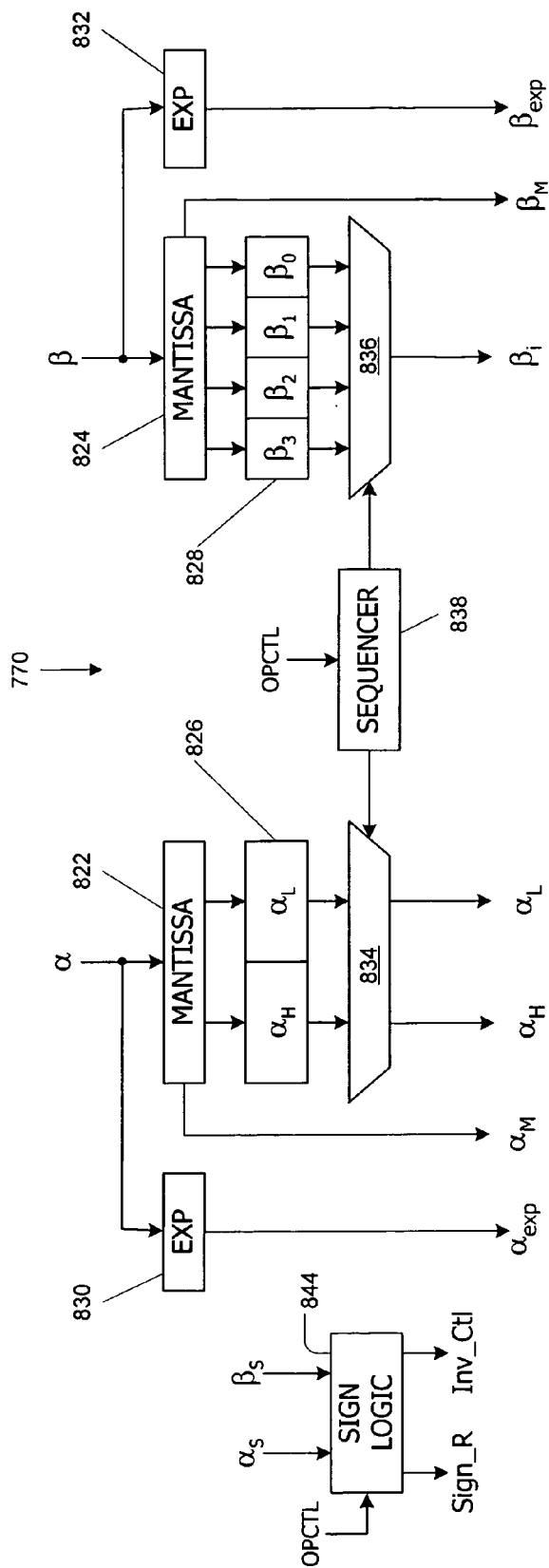
FIG. 8B is a block diagram of an operand preparation block for double-precision arithmetic operations in the multipurpose arithmetic functional unit of FIG. 7A.

FIG. 8B is a block diagram of DP preparation block 770 according to an embodiment of the present invention. DP preparation block 770 prepares fp64 operands α and β for DMUL operations. More specifically, mantissa extractors 822 and 824 extract the 72 significant bits from operands α and β, respectively, add a leading 1 to create 53-bit mantissas ($α_M$ and $β_M$), and write the resulting mantissas to registers 826 and 828, respectively. Mantissa extractors also deliver the 53-bit mantissas $α_M$ and $β_M$ via paths 827 and 829 to product path 710 for use in DADD operations. Exponent extractors 830 and 832 extract and deliver the respective 11-bit exponents (αexp and βexp) of operands α and β to product path 710 of FIG. 7A.

In one embodiment, registers 826 and 828 are segmented, and mantissa bits are read out through selection muxes 834, 836 operating under control of a sequencer circuit 838, which is responsive to an OPCTL signal indicating whether the currently selected operation is a DMUL operation. For DMUL operations, sequencer circuit 838 controls selection mux 836 to select multiplier portions $β_0$, $β_1$, $β_2$, and $β_3$ sequentially, e.g., on four successive cycles. In parallel, sequencer circuit 838 controls selection mux 834 to read out multiplicand portions $α_H$ and $α_L$ in parallel four times. These values are delivered to the multipliers in product path 710 as described below.

DP preparation block 770 also includes a sign logic circuit 844. For DMUL operations, the sign logic circuit determines a sign bit (Sign_R) for the product based on the respective sign bits ($α_S$ and $β_S$) of the operands α and β and provides this sign bit to output control unit 706 at stage 15. For DADD operations, sign logic circuit 844 determines whether the operation entails subtraction, which is performed by inverting the mantissa of the smaller operand and adding, and provides a corresponding control signal (Inv_Ct1) to a conditional inverter in product path 710. Sign logic circuit 844 may be of generally conventional design. The mantissa path provides the complete (53-bit) mantissas of operands α and β to product path 710 during DADD operations.

C. Elements in Product Path

Product path 710 is shown in FIG. 7B. In addition to multipliers 716, 718 and shift circuits 732, 734 referred to above, product path 710 includes lookup tables 742, 744 that provide UFA coefficients $F_2$, $F_1$, respectively; multiplicand (M1, M2) selection muxes 746, 748; a µ1 selection mux 750; a squaring circuit 752; Booth encoders 754, 756; an SD4 recoder 758; and a µ2 selection mux 760. These additional circuits operate to generate and select appropriate inputs to multipliers 716, 718 for both UFA and PI operations.

1. Product P2

Product P2 (i.e., M2*µ2 in the notation of Eq. 5) corresponds to $F_2(x_b)*x_h^2$ for UFA operations and to $A*x_c$ for PI operations. For DMUL operations, the multiplier 718 that generates product P2 is used to compute the sub-product $α_H*β_i$. To generate multiplicand M2, table address Taddr from UFA preparation block 702 is provided to lookup table 742, which returns a corresponding coefficient $F_2$. In one embodiment, the lookup table operation requires all of stage 2 and part of stage 3 to complete. At the end of stage 3, in response to an OPCTL signal, selection mux 746 selects coefficient $F_2$ for UFA operations, operand A for PI operations, or partial mantissa $α_H$ from DP preparation block 770 for DMUL operations. For DADD operations, selection mux 746 is driven by an OPCTL signal in combination with the Swap signal generated by alignment control block 704 (FIG. 7A) and selects the larger of operands α and β.

In parallel, to generate multiplier µ2, operand $x_h$ is provided to a squaring circuit 752. During stage 2, squaring circuit 752, which may be of generally conventional design, squares $x_h$ to generate $x_h^2$. In some embodiments, squaring circuit 752 can be optimized in various ways. For example, in this embodiment, $x_h^2$ is used in approximating a function, and a computation $x_h^2$ with reduced precision (e.g., fewer bits) may be acceptable for this purpose. Where this is the case, one or more LSBs of the input $x_h$ that do not contribute to the reduced precision $x_h^2$ may be dropped, allowing a reduction in the size of squaring circuit 752. Other optimizations exploit the fact that the multiplier and multiplicand are identical operands; consequently, the logic for adding partial products can be simplified as compared to a general purpose multiplier. Such optimizations are known in the art. In parallel, a selection mux 772 is driven by an OPCTL signal to select partial mantissa $\beta_i$ for DMUL operations or operand $x_c$ for PI operations.

During stage 3, the resulting $x_h^2$ is then recoded into a conventional Booth encoding (e.g., Booth2, radix 4) by sign digit (SD4) recoder 758, which may also be of conventional design; SD4 recoder 758 can convert $x_h$ from a redundant (carry-save) form produced by squaring circuit 752 to Booth-encoded form. In parallel, during stage 3, the one of partial mantissa $\beta_i$ and operand $x_c$ selected by mux 772 is Booth encoded by Booth encoder 754, which may also be of conventional design. At the end of stage 3, in response to an OPCTL signal, selection mux 760 selects, as 42, Booth-encoded operand $x_h^2$ for UFA operations, Booth-encoded operand $x_c$ for PI operations, or Booth-encoded partial mantissa $\beta_i$ for DMUL operations. In an alternative embodiment, selection between $x_c$, $x_h^2$ and $\beta_i$ might be made before Booth encoding the selected result.

During stages 4-6, multiplier 718 computes the product of multiplicand M2 and multiplier Bµ2. Multiplier 718 may be of generally conventional design. In one embodiment, multiplier 718 is a 27×17-bit multiplier circuit that includes a set of Booth multiplexers (e.g., nine 28-bit Booth muxes) followed by a suitable carry-save adder (CSA) tree (e.g., three 30-bit 3:2 CSAs, followed by two 32-bit 3:2 CSAs, followed by one 36-bit 4:2 CSA). For UFA operations, multiplier 718 operates as a 17×17 multiplier, for PI operations as a 24×13 multiplier, and for DMUL operations as a 27×14 multiplier. Where the operands are smaller than the 27×17 multiplier size, leading zeroes are advantageously introduced. It should be noted that the final three rows of the 27×17 multiplier are not used as 27-bit rows for any of the operations described herein; in some embodiments, the final three rows may be reduced to 24-bit width for additional space savings.

In some embodiments, the final product P2 is provided in a redundant carry-save form (indicated herein by P2c, P2s); in other embodiments, multiplier 718 further includes a conventional carry propagation adder (CPA) that combines the carry and save results into a final non-redundant form. Other multipliers may also be used.

Multiplier 718 is advantageously configured to handle the different operand formats used for UFA, PI, and DMUL operations. For UFA operations, the operand $x_h^2$ is in a sign-magnitude form while the coefficient $F_2$ (which might be positive or negative) could be stored in either two's complement or sign-magnitude form. For PI operations, coordinate $x_c$ is in a fixed-point, two's complement form while parameter A has a 24-bit mantissa in sign-magnitude form. For DMUL operations, both operands are in sign-magnitude format.

In one embodiment, to facilitate handling UFA and PI operations by the same multiplier, coefficients $F_2$, $F_1$, $F_0$ are stored in the lookup tables in two's complement form. Use of the two's complement representation can support a more compact Booth multiplier. For instance, given that $x_h^2$ is unsigned, it follows that in Booth multiplication the final partial product would always be non-complemented (i.e., the Booth algorithm selects either +$F_2$ or 0). If the multiplier is represented in sign-magnitude form, a negative multiplier would require inversion and adding 1 in the LSB. In some instances, this could undesirably extend the height and/or critical path of the multiplier tree. In other embodiment, e.g., where the resulting height of the multiplier tree would be acceptable or where the tree implements a different multiplication algorithm, coefficients $F_2$, $F_1$, $F_0$ may be stored in sign-magnitude format.

For PI operations, the sign bit of parameter A can be provided to the partial product generator and used to invert the sign of the Booth partial products where appropriate. For instance, if the Booth algorithm would normally select −2A, then 2|A| should be chosen in the event that A is less than zero and vice versa. In addition, any zero term is forced to "positive" zero (all zeroes) rather than "negative" zero (all ones). Under these conditions, multiplier 718 generates correct sign extensions for all partial products and therefore correct results. It is to be understood that the present invention is not limited to particular operand formats or particular multiplier circuit designs.

A bypass path 717 around multiplier 718 is advantageously provided. For DADD operations, bypass path 717 is used to bypass the mantissa ($\alpha_M$ or $\beta_M$) of the larger of the operands (selected by mux 746) around multiplier 716. A selection mux 774 at the output of multiplier 718 is driven by an OPCTL signal to select the large operand for DADD operations and the product result from multiplier 718 for all other operations. Where the product is in redundant form at the end of stage 6, the large operand can be propagated in the P2s field with all bits of the P2c field set to zero.

At stage 7, shift circuit 732 applies the right shift indicated by the Sh_P2 control signal as an arithmetic shift to P2. As is known in the art, an arithmetic right shift requires sign extending the bit field, inserting leading zeroes for positive numbers and leading ones for negative numbers. In some embodiments, an arithmetic shift can be applied to P2c and P2s in redundant form. This is done using combinatorial logic based on the respective MSBs of P2c and P2s and the desired sign of the product P2, which is known because the respective signs of the factors M2 and p2 are known. For example, for n-bit P2s and P2c, suppose that the product is known to be negative, and the MSBs $P2s_{n-1}$ and $P2c_{n-1}$ are both zero. In this case, a negative sign (1) in the nth bit position can be obtained by using the sign extensions $P2s_n$=0 and $P2c_n$=1 (or vice versa). Other cases can be resolved using similar logic. In one embodiment, the sign-extension bit for P2s is set to 1 if the product is negative and to the logical OR of $P2s_{n-1}$ and $P2c_{n-1}$ otherwise, while the sign-extension bit for P2c is set to 0 if the product is non-negative and to the logical AND of $P2s_{n-1}$ and $P2c_{n-1}$ otherwise. Different conventions may also be used. In another embodiment, P2 is in non-redundant form and a conventional arithmetic shift circuit may be used. For DMUL and DADD operations, shift circuit 732 does not right shift the input P2.

The resulting shifted P2 (in redundant or non-redundant form, as desired) is provided to addition path 714. For DMUL and DADD operations, P2 is left-aligned in a 68-bit field.

2. Product P1

Product P1 (M1*µ1) corresponds to $F_1(x_b)*x_h$ for unary functions and to $B*y_c$ for planar interpolation. For DMUL operations, the multiplier 716 that generates product P1 is used to compute the sub-product $\alpha_L*\beta_i$. To generate multiplicand M1, table address Taddr from UFA preparation block 702 is provided to lookup table 744, which returns a corresponding coefficient $F_1$. In one embodiment, the lookup table operation requires all of stage 2 and part of stage 3 to complete. At the end of stage 3, in response to an OPCTL signal, selection mux 748 selects coefficient $F_1$ for UFA operations, operand B for PI operations, or partial mantissa $\alpha_L$ from DP preparation block 770 for DMUL operations. For DADD operations, selection mux 748 is driven by an OPCTL signal in combination with the Swap signal generated by alignment control block 704 (FIG. 7A) and selects the mantissa ($\beta_M$ or $\alpha_M$) of the smaller of operands $\alpha$ and $\beta$.

In parallel, to generate multiplier $\mu 1$, during stage 2, $\mu 1$ selection mux 750 is driven by an OPCTL signal to select operand $x_h$ for unary functions, operand $y_c$ for planar interpolation operations, or partial mantissa $\beta_l$ for DMUL operations. During stage 3, the selected operand $\mu 1$ is Booth encoded to produce a multiplier B$\mu 1$.

During stages 4-6, multiplier 716 computes the product of multiplicand M1 and multiplier B$\mu 1$. Multiplier 716 may be of similar design to multiplier 718 described above and may provide the final product in a redundant (carry-save) form as results P1c and P1s. In other embodiments, multiplier 716 may include a conventional carry propagation adder (CPA) that combines the carry and save results into a final nonredundant form.

A bypass path 715 around multiplier 716 is advantageously provided. For DADD operations, bypass path 715 is used to bypass the mantissa ($\beta_M$ or $\alpha_M$) of the smaller of the operands (selected by mux 748) around multiplier 716. A selection mux 776 at the output of multiplier 716 is driven by an OPCTL signal to select the small operand for DADD operations and the product result from multiplier 716 for all other operations. Where the product is in redundant form at the end of stage 6, operand $\beta$ can be propagated in the P1s field with all bits of the P1c field set to zero.

At stage 7, shift circuit 734 applies the right shift indicated by the Sh_P1 control signal as an arithmetic shift to P1, similarly to shift circuit 732 described above. For DMUL operations, the Sh_P1 control signal always indicates a 27-bit shift, which is applied in a 68-bit wide field. The resulting shifted P1 (in redundant or non-redundant form, as desired) is provided to a conditional inverter 780 that is controlled by an OPCTL signal in combination with the Inv_Ct1 signal produced by sign logic circuit 844 (FIG. 8B). For DADD operations, conditional inverter 780 inverts the small operand if the Inv_Ct1 signal indicates that the operation entails subtraction; for other operations, conditional inverter 780 passes its input through to addition path 714 without modification.

It should be noted that there is no necessary correlation between which pair of factors multiplier 718 processes for one operation and which pair it processes for another operation. For instance, instead of computing $F_2*x_h^2$ for UFA operations and $A*x_c$ for PI operations, multiplier 718 could compute $F_2*x_h^2$ for UFA operations and $B*y_c$ for PI operations. Many other possible permutations will be apparent to one of ordinary skill in the art.

3. Exponent Logic

Exponent logic block 778 computes the exponent for the double-precision product $\alpha*\beta$. In one embodiment, exponent logic block 778 receives the 11-bit exponent portions ($\alpha$exp and $\beta$exp) for fp64 operands $\alpha$ and $\beta$ from DP operand prep block 770 of FIG. 7A. For normal fp64 operands, the mantissas are in the range [1, 2) and thus the product of mantissas is also in the range [1, 4). The exponent of the products is the sum of the exponents, and exponent logic block 778 advantageously computes that sum and provides the sum of exponents as an exponent result Rexp.

It should be noted that for fp64 input operands, each exponent is biased upward by 1023. Simply adding the received exponents would double the bias. Accordingly, exponent logic block 778 may include additional circuitry that subtracts the bias to produce an exponent result Rexp=$\alpha$exp+$\beta$exp−1023. Exponent logic block 778 may be of generally conventional design and may be located at any stage of MAF unit 220 prior to the output stage. The 11-bit exponent result Rexp is passed to output control blocks 706 of stage 15 for use in generating the final result.

D. Elements in Pixel Offset Path

Pixel offset path 712, as shown in FIG. 7C, includes shift circuits 736, 738, 740; two's complement circuits 763, 764; lookup table 762; selection mux 766; delta block 720; and four adder circuits 768. These circuits cooperate to compute four $\Delta_i$ values according to Eq. 3 for PI operations and a biased coefficient $F_0(x_b)+b_0$ for UFA operations. Specifically, during PI operations, delta block 720 computes $A*dx_i+B*dy_i$ for each offset ($dx_i$, $dy_i$); during UFA operations, delta block 720 produces the rounding bias $b_o$. Adders 768 add the results from delta block 720 to planar interpolation parameter C or approximation coefficient $F_0(x_b)$ as appropriate.

As noted above, operands A and B are aligned prior to multiplication by the pixel offsets using right shift circuits 738, 740 during stage 2. Right shift circuits 738, 740, which may be of generally conventional design, receive respective signals Sh_A and Sh_B, which may be generated by alignment control block 704 or by a component upstream of MAF unit 220 as described above. During stage 3, two's complement circuits 763, 764 compute the two's complement of shifted operands A and B, respectively, if the operand is negative. In one embodiment, two's complement circuits 763, 764 are implemented using an inverter followed by an increment circuit that adds 1 to the LSB (thereby forming the two's complement) followed by a multiplexer that selects between the two's complement and the non-inverted input. The resulting values $A_{sh}$ and $B_{sh}$ are provided to delta block 720.

Figure 9:
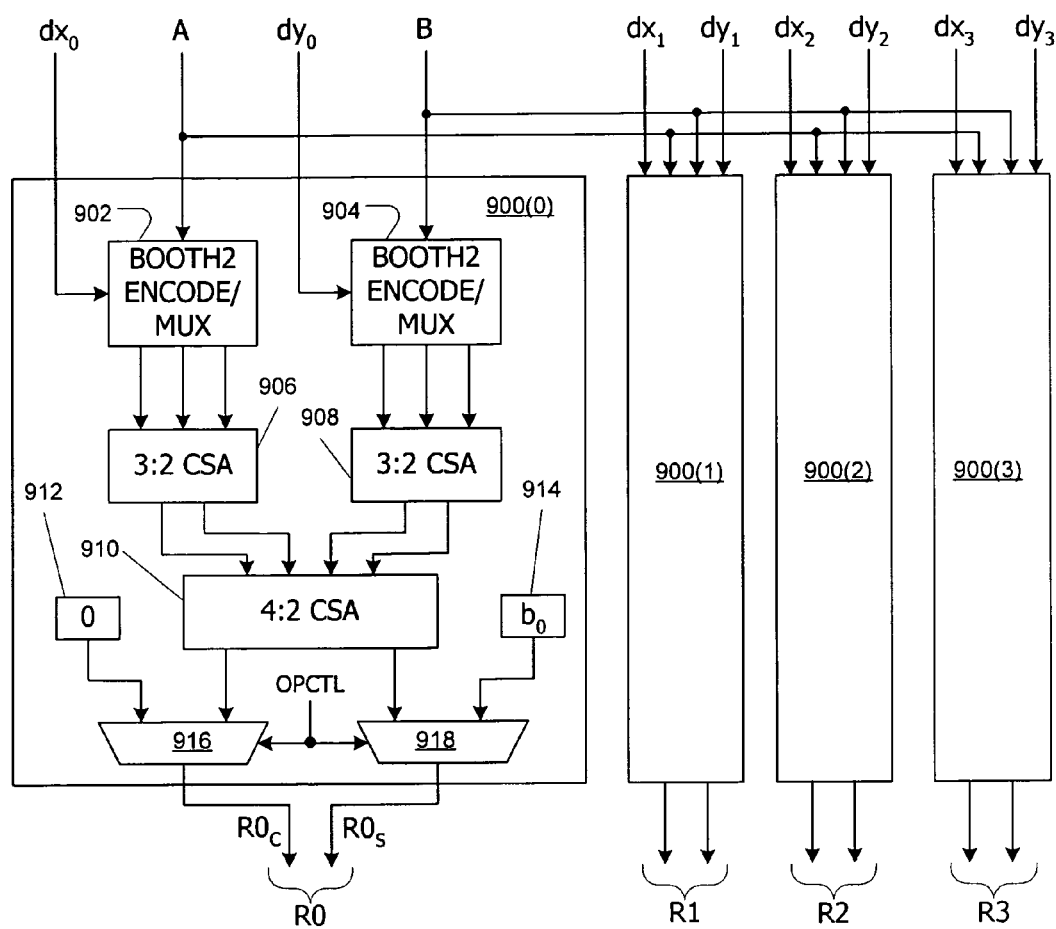
FIG. 9 is a block diagram of a delta block for the offset path of FIG. 7C.

FIG. 9 is a block diagram of delta block 720, which operates during stages 4-6. As shown, delta block 720 includes four parallel multiply-add paths 900 for computing $A_{sh}*dx_i+B_{sh}*dy_i$. In FIG. 9, only path 900(0) is shown in detail; it is to be understood that the other three paths 900(1)-900(3) may contain identical components. Path 900(0) includes two Booth encoder/muxes 902, 904; two 3:2 carry-save adders (CSAs) 906, 908; one 4:2 CSA 910; a zero register 912, a $\beta$ register 914; and output selection muxes 916, 918.

During stage 4, Booth encoder/mux 902, which may be of generally conventional design, receives multiplicand A and multiplier $dx_0$ and computes three partial products. Booth encoder/mux 904 receives multiplicand B and multiplier $dy_0$ and computes another three partial products. During stage 5, the partial products from Booth mux 902 are added in 3:2 CSA 906 while the partial products from Booth mux 904 are added in 3:2 CSA 908. During stage 6, 4:2 CSA 910 adds the respective redundant-form results from CSAs 906, 908, producing a redundant-form result that is provided to output selection muxes 916, 918 via paths 920, 922.

Muxes 916, 918 respond to an OPCTL signal that indicates whether a UFA or PI operation is in progress. For PI operations, the results on paths 920, 922 are selected as result R0 (R0c, R0s in redundant form). For UFA operations, mux 916 selects a zero value provided by register 912 while mux 918 selects a bias value $b_0$ that is provided by register 914. In general, different UFA operations may use different biases; the correct bias can be selected from register 914 based on an OPCTL signal indicating which UFA operation is being executed. Paths 900(1)-900(3) advantageously operate in a parallel manner with different pixel offsets to produce respective results R1, R2, R3.

Referring again to FIG. 7C, during stages 2 and 3, the term to be added to the results from delta block 720 is prepared. Specifically, lookup table 762 receives the table address Taddr from UFA preparation block 702 and returns a corresponding coefficient $F_0$. In parallel, operand C is right shifted by right shift circuit 736. Right shift circuit 736, which may be of generally conventional design, receives the control signal Sh_C, which may be generated by alignment control block 704 or by a component upstream of MAF unit 220 as described above. During stage 3, selection mux 766 selects, as a result R4, coefficient $F_0$ for a unary operation or operand C for planar interpolation. During stages 4-6, the selected result R4 is inverted by a conditional inverter 767 if a subtraction is required.

During stage 7, each of adders 768(0)-768(3) receives result R4 and a respective one of results R0-R3 from delta block 720 as shown. Each adder 768 may be implemented as a 3:2 CSA that produces a result $P0_i$ in redundant form. The four $P0_i$ values are provided to addition path 714.

E. Elements in Addition Path

Addition path 714, as shown in FIG. 7A, includes four add blocks 722, four normalization blocks 724, and four multiply blocks 726. For purposes of UFA and PI operations, the four routes through addition path 714 are interchangeable. For DMUL and DADD operations, additional functionality is implemented using add blocks 722(0) and 722(1). In particular, add block 722(0) is configured to provide result data to add block 722(1) for further processing via a data path 723.

Figure 10A:
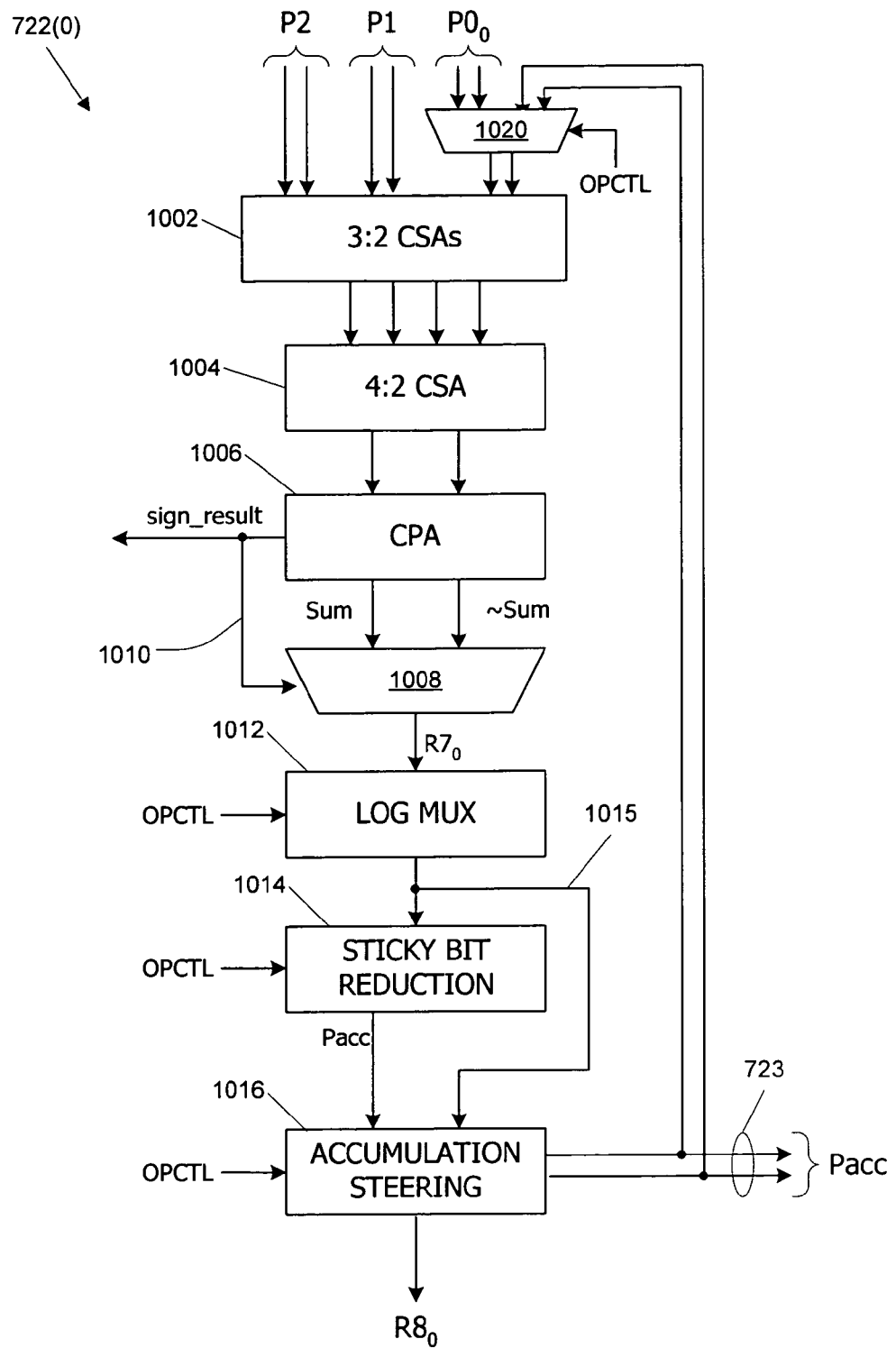
FIG. 10A is a block diagram of an add block for the multipurpose arithmetic functional unit of FIG. 7A.

FIG. 10A is a block diagram of an add block 722(0) that receives redundant-form results P2, P1 and $P0_0$ and computes their sum during stages 7 and 8. A selection mux 1020 is driven by an OPCTL signal to select an accumulation result (running sum) Pacc for DMUL operations and the offset path result $P0_0$ for all other operations.

In this example, add block 722(0) computes the sum using two 3:2 CSAs 1002 followed by one 4:2 CSA 1004 followed by one carry propagation adder (CPA) 1006 that computes the result in non-redundant form and provides Sum and inverse Sum (denoted ~Sum) outputs. CSAs 1002, 1004 and CPA 1006 may be of conventional design. CSAs 1002, 1004 and CPA 1006 are advantageously made wide enough to add 68-bit inputs, allowing these adders to handle the iterative DMUL operation described above with reference to FIGS. 6A-6D.

The final result for UFA and PI operations is expressed in sign-magnitude format, but the multipliers and adders described herein produce results in two's complement format. Accordingly, selection mux 1008 selects the Sum output as a result $R7_0$ if the sign_res signal on path 1010 indicates that the output of CPA 1006 is a positive result and the ~Sum output if the sign_res signal indicates a negative result. In one embodiment, the sign_res signal is just the MSB of the Sum output and is zero (one) for a positive (negative) result. While selecting the ~Sum output is not a true two's complement, the off-by-one error is generally not important in embodiments where PI and UFA operations both involve a degree of approximation. If desired, a plus-1 adder could be used to add 1 to the ~Sum result and obtain the two's complement result.

For DMUL operations, the products P2 and P1 are already in sign-magnitude format, the sign is positive, and the Sum result is always selected. For DADD operations, the sum is positive unless the exponents of the input operands are equal, in which case a negative sum is possible; the ~Sum result is advantageously selected where the sum is negative.

Log mux 1012 passes through the result $R7_0$ from selection mux 1008 unmodified unless the OPCTL signal indicates that a LOG operation is in progress. In that event, log mux 1012 adds the exponent of the original floating-point operand x to the result $R7_0$.

Sticky bit reduction unit 1014 includes OR-reduction logic that reduces the last 14 bits of the 68-bit result $R7_0$ to a single sticky bit, leaving a 54-bit accumulation result Pacc (plus one sticky bit) to be propagated to accumulation control unit 1016. Sticky bit reduction unit 1014 may be of generally conventional design, and a detailed description is omitted.

Accumulation steering unit 1016 operates to select and direct results from add block 722(0). For UFA and PI operations, accumulation control unit 1016 passes the result received via a bypass path 1015 from log mux 1012 as result $R8_0$ to normalization block 724. For DMUL operations, accumulation control unit 1016 directs the result Pacc from sticky bit reduction unit 1014 to the input of selection mux 1020 for the next accumulation pass. When accumulation is complete, accumulation steering unit 1016 directs the final Pacc result to add block 722(1) via path 723 (see FIG. 7A). After completion of the final iteration of the accumulation operation, accumulation steering unit 1015 may reset Pacc to zero. In other embodiments a separate zero input is provided to selection mux 1020 and selected on the first iteration of a DMUL accumulation.

For DADD operations, accumulation control unit 1016 directs the first result Pacc from sticky bit reduction unit 1014 to add block 722(1) via path 723.

Figure 10B:
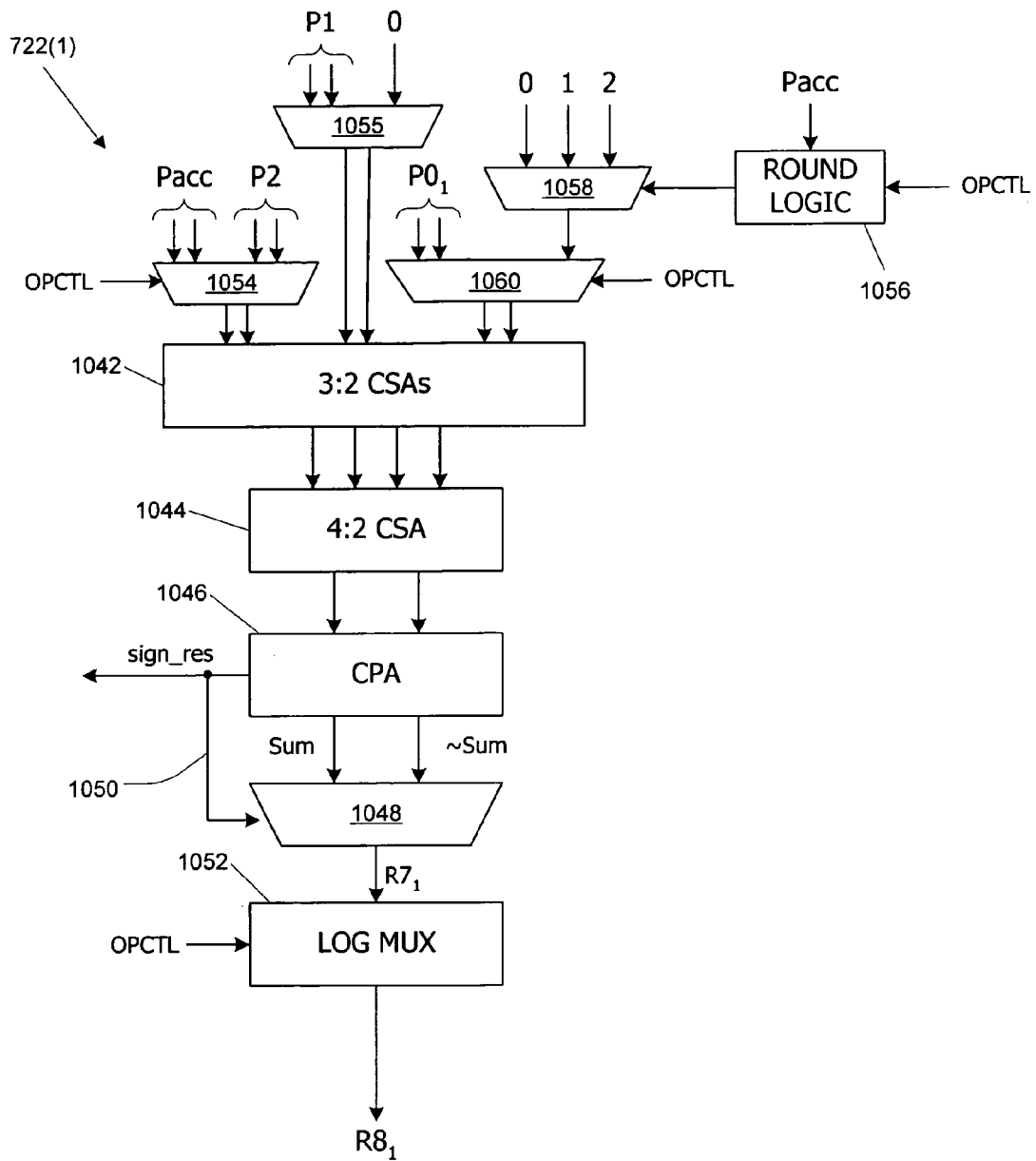
FIG. 10B is a block diagram of another add block for the multipurpose arithmetic functional unit of FIG. 7A.

FIG. 10B is a block diagram of an add block 722(1) that receives redundant-form results P2, P1 and $P0_1$ and computes the sum during stages 7 and 8. For UFA and PI operations, add block 722(1) operates virtually identically to add block 722(0). For DMUL and DADD operations, add block 722(1) is used to implement rounding and two's complement operations.

At the input of add block 722(1), selection mux 1054 selects between result P2 from product path 710 and result Pacc received via path 723 from add block 722(0) in response to an OPCTL signal, with result Pacc being selected for DMUL and DADD operations and P2 being selected for UFA and PI operations. Selection mux 1055 is driven by an OPCTL signal to select 0 for DMUL and DADD operations and P1 for UFA and PI operations.

For DMUL and DADD operations, rounding logic 1056 determines a constant (0, 1, or 2) to add, depending on the least significant bits (LSBs) of the accumulated result Pacc and/or the sign of the accumulated result Pacc. More specifically, for DMUL operations, the result is in sign-magnitude format, and rounding logic 1056 determines whether to round up (add 1) or not (add 0). The determination may be made by applying conventional techniques (e.g., any of the IEEE 754 rounding rules) to process the LSBs (and sticky bit) of accumulation result Pacc. Rounding logic 1056 selects the constant-1 input or the constant-0 input based on the determination. For DADD operations, as long as the exponents are unequal, the result of the addition is positive, and rounding logic 1056 determines whether to round up or not as in the DMUL case. When the result is negative, the received result Pacc (which corresponds to ~Sum as described above) should be incremented by 2 to produce the appropriate positive number. Accordingly, rounding logic 1056 selects the constant-2 input during DADD operations when the ~Sum output of CPA 1006 was selected in add block 722(0); the sign bit of Pacc can be provided to rounding logic 1056 and used to determine whether the sum is positive or negative.

For DMUL and DADD operations, rounding logic 1056 operates a selection mux 1058 to propagate the selected constant to selection mux 1060. Selection mux 1054 selects between result $P0_1$ from offset path 712 and the constant selected by mux 1058: for UFA and PI operations, $P0_1$ is selected, and for DMUL and DADD operations, the constant is selected.

Add block 722(1) computes the sum of the selected inputs using two 3:2 CSAs 1042 followed by one 4:2 CSA 1044 followed by one carry propagation adder (CPA) 1046 that computes the result in non-redundant form and provides Sum and inverse Sum (denoted ~Sum) outputs. CSAs 1042, 1044 and CPA 1046 may be of conventional design and may be generally similar to corresponding components of add block 722(0). CSAs 1042, 1044 and CPA 1046 are advantageously made wide enough to add 53-bit inputs, allowing these adders to handle mantissas for DMUL and DADD operations.

As described above for add block 722(0), the final result for UFA and PI operations is expressed in sign-magnitude format, but the multipliers and adders described herein produce results in two's complement format. Accordingly, for UFA and PI operations, selection mux 1048 selects the Sum output as a result $R7_0$ if the sign_res signal on path 1050 indicates that the output of CPA 1046 is a positive result and the ~Sum output if the sign_res signal indicates a negative result. In one embodiment, the sign_res signal is just the MSB of the Sum output and is zero (one) for a positive (negative) result. While selecting the ~Sum output is not a true two's complement, the off-by-one error is generally not important in embodiments where PI and UFA operations both involve a degree of approximation. If desired, a plus-1 adder could be used to add 1 to the ~Sum result and obtain the two's complement result. For DMUL and DADD operations, the sum is always positive, and the Sum output of CPA 1046 is selected.

Log mux 1052 passes through the result $R7_0$ from selection mux 1048 unmodified unless the OPCTL signal indicates that a LOG operation is in progress. In that event, log mux 1052 adds the exponent of the original floating-point operand x to the result $R7_0$.

The implementation of add blocks 722(2) and 722(3) may be generally similar to add block 722(1), except that muxes 1054, 1055, 1058, 1060 and rounding logic 1056 may be omitted. Further, where add blocks 722(2) and 722(3) are not used to handle double-precision mantissas, the widths of their adders and data paths may be smaller than those of adder 722(1) or adder 722(0).

Referring again to FIG. 7A, during stages 9 and 10, normalization blocks 724(i) left-shift the results $R8_i$ to place a "1" in the leading mantissa position. Normalization blocks 724(i) may be of generally conventional design, and a detailed description is omitted. It should be noted that for DADD operations, normalization block 724(1) receives the block exponent B1_exp generated in alignment control block 704 (FIG. 7A) and decrements the block exponent by an amount corresponding to the left shift. For DMUL operations, normalization block 724(1) increments the product exponent by 1 in the event that the product of mantissas is in the range [2, 4).

During stages 11-14, multiply blocks 726(i), which may be of generally conventional design, may be used to multiply the normalized results $R9_i$ by a perspective parameter w', to support perspective-correct interpolation. Where perspective correction is not desired, multiply blocks 726 can be bypassed using selection muxes 728. For instance, multiply blocks 726 may be active during IPAW operations and inactive (bypassed) during IPA and all UFA operations.

For efficiency, perspective parameter w' can be computed once for each fragment and stored in a register (not shown) or other location accessible to multiply blocks 726. For example, the reciprocal (1/w) of the homogeneous coordinate w for vertices of a primitive can be computed by MAF unit 220 executing one or more RCP operations. Next, 1/w can be interpolated for a fragment location (or group of four fragment locations) by MAF unit 220 executing an IPA operation to determine 1/w'. Finally, the reciprocal of 1/w' (which is w') is computed by MAF unit 220 executing another RCP operation. It should be noted that each multiply block 726(0)-726(3) can store and use a different w' value.

F Elements in Stage 15

FIG. 11 is a block diagram of a representative output control block 706(0). An alignment circuit 1102 receives the result $R14_0$ and the exponent result Rexp (for DMUL and DADD operations) from selection mux 728(0), the sign_res signal from CPA 1006, and the sign_t signal from trig preprocessing block 804 (FIG. 8A). Based on this information, alignment circuit 1102 performs final alignment, including setting a sign bit for the result and, in some instances, dropping a leading "1" for compatibility with an fp32 or fp64 output format.

Final selection logic 1104 determines whether the result $R14_0$ should be overridden by any of various "special number" results (e.g., overflows, zero) that may be defined. The determination may be based on considerations such as whether any of the inputs was an fp32 or fp64 special number (overflow, underflow), or whether overflows or underflows occurred in the arithmetic pipeline. For example, any underflow might be flushed to zero and any overflow to a maximum (or "infinite") value. Conventional logic circuits for detecting such conditions may be implemented in final selection logic 1104 and/or in earlier pipeline stages (e.g., stage 1). Output mux 1106 selects the pipeline result from alignment circuit 1102 or one of the special numbers in response to a signal on line 1108 generated by final selection logic 1104.

Referring again to FIG. 7A, the final results are provided on paths $OUT_0$-$OUT_3$. In one embodiment, the result for a UFA or PI operation includes only a 24-bit sign and mantissa; the exponent portion may be determined by separate processing circuits of conventional design and appended to the result at a downstream processing stage using conventional post-processing circuits. Double-precision arithmetic results, which are wider, may be delivered over two cycles using one output path (e.g., $OUT_1$), or two of the output paths (e.g., $OUT_1$ and $OUT_0$) may be used to deliver the result in a single cycle.

G. Bypass Paths

Not all components of MAF unit 220 are necessary for all operations. For example, during PI operations, lookup tables 742, 744, and 762 and squaring circuit 752 are not needed; during UFA operations, the multipliers and adders in delta block 720 are not needed; during DADD operations, multipliers 718 and 716 are not needed; and during all operations except IPAW, perspective correction multipliers 726 are not needed. As described above, bypass paths are provided around such components using various selection muxes. When a particular circuit block is bypassed during an operation, that block may be set into an inactive state to reduce power consumption or allowed to operate normally with its output being ignored.

It will be appreciated that the MAF unit described herein is illustrative and that variations and modifications are possible. Many of the circuit blocks described herein provide conventional functions and may be implemented using techniques known in the art; accordingly, detailed descriptions of these blocks have been omitted. The division of operational circuitry into blocks may be modified, and blocks may be combined or varied. In addition, the number of pipeline stages and the assignment of particular circuit blocks or operations to particular stages may also be modified or varied. The selection and arrangement of circuit blocks for a particular implementation will depend in part on the set of operations to be supported, and those skilled in the art will recognize that not all of the blocks described herein are required for every possible combination of operations.

III. Examples of MAF Unit Operations

MAF unit 220 advantageously leverages the circuit blocks described above to support PI, UFA, and double-precision arithmetic operations in an area-efficient manner. Accordingly, the operation of MAF unit 220 depends in at least some respects on which operation is being executed. Section III.A describes the use of MAF unit 220 to perform UFA operations. Section III.B describes PI operations. Section III.C describes double-precision multiplication operations. Section III.D describes double-precision addition operations.

A. Unary Function Approximation (UFA) Operations

For UFA operations, MAF unit 220 receives operand x and an opcode indicating which unary function is to be performed. As described above, operand x is advantageously received in a reduced form.

During stage 1, UFA preparation block 702 generates a table address Taddr and an offset $x_h$ from operand x. In addition, for trigonometric functions, UFA preparation block 702 may also perform quadrant reduction as described above. Alignment control circuit 704 determines, based on operand x, whether shifting of products P1 or P2 will be needed and generates appropriate Sh_P1 and Sh_P2 signals.

During stage 2, the table address Taddr is provided to lookup tables 742, 744, and 762, which return the appropriate coefficients $F_2$, $F_1$, and $F_0$. It should be noted that lookup tables for different coefficients and different unary functions may be physically or logically separated, and that any addressable storage device or circuit may be operated as a "lookup table" in this context. The lookup table mechanism may also include translation circuitry for converting the received Taddr signal to a usable address, or the Taddr signal may be provided in a suitable format so that further translation is not required. Nonvolatile storage (e.g., a conventional ROM) is advantageously used so that coefficients need not be reloaded every time system power is restored, but volatile storage (e.g., RAM) could also be used if desired.

Also during stage 2, offset $x_h$ is squared in squaring circuit 752 to provide $x_h^2$. In some embodiments, the squaring operation may extend into stage 3. In parallel, µ1 selection mux 750 selects offset $x_h$.

During stage 3, multiplier $x_h^2$ is Booth encoded by SD4 recoder 758, and multiplier $x_h$ is Booth encoded by Booth encoder 756. At the end of stage 3, selection mux 760 selects Booth-encoded $x_h^2$ as Bµ2. Multiplicand selection muxes 746, 748, and 766 select coefficients $F_2$, $F_1$, and $F_0$ respectively.

During stages 4-6, multiplier 718 computes $P2=F_2 * x_h^2$ and multiplier 716 computes $P1=F_1 * x_h$; these products may be provided in redundant or non-redundant form as described above. In pixel offset section 712, coefficient $F_0$ passes through on the R4 path. In delta block 720 (FIG. 9), selection muxes 916, 918 select the values 0 and β, respectively, for the R0c and R0s paths. In some embodiments, rounding bias $b_0$ might not be used; in that case, zeroes would be applied to both the R0c and R0s paths. It should be noted that the same values applied to the R0c and R0s paths may also be applied to the other output paths R1c, R1s, R2c, R2s, R3c, R3s of delta block 720.

During stage 7, right shift circuits 732 and 734 apply right shifts to results P2 and P1 in response to the Sh_P2 and Sh_P1 signals from alignment control block 704. Shifting may be applied to redundant or non-redundant forms of P2 and P1 as described above. Adder 768(0) adds the R0c and R0s signals from delta block 720 to coefficient $F_0$ from the R4 path, producing result $P0_0$ in carry-save form. Shifted P2 and P1 and result $P0_0$ are supplied to adder 722(0). It should be noted that, in parallel, adders 768(1)-768(3) can compute the same sum as adder 768(0) and that shifted P2 and P1 and results $P0_1$-$P0_3$ can be supplied to adders 722(1)-722(3).

During stage 8, adder 722(0) completes the computation of $P2+P1+P0_0$, converts the result to a magnitude representation and, in the case of a LOG operation, adds the exponent. During stages 9 and 10, normalization block 724(0) normalizes the result $R8_0$ to produce result $R9_0$. The same operations may occur in parallel in adders 722(1)-722(3) and normalization blocks 724(1)-724(3).

Perspective correction is generally not applicable to UFA operations, and accordingly, multiplier 726(0) in stages 11-14 may be bypassed using selection mux 728(0). The bypass path may include timing circuitry for delaying propagation of the result by an appropriate number of stages, or those stages may be skipped, making the MAF pipeline effectively shorter for unary operations. Again, multipliers 726(1)-726(3) and selection muxes 728(1)-728(3) can parallel the operation of multiplier 726(0) and mux 728(0).

In some embodiments, multiplier 726(0) might be leveraged to scale a unary function result $f(x)$ by some scale factor p. For example, a scale factor p could be supplied as an additional operand and bypassed into multiplier 726(0) in place of w'; multiplier 726(0) would then compute $p*f(x)$.

During stage 15, output control circuit 706(0) formats and selects the appropriate result for propagation on path $OUT_0$. In parallel, the same result may appear on output paths $OUT_1$-$OUT_3$. In some embodiments, rather than generating duplicate results, only one of the four parallel pipelines might be active during UFA operations.

In one embodiment, it is desirable for issue circuit 204 (FIG. 2) to issue up to four UFA instructions for MAF unit 220 in one clock cycle, with all four results arriving simultaneously on data transfer path 226 after some number of clock cycles. For example, a single opcode identifying a UFA instruction might be issued together with four operands x on which the UFA operation is to be executed, with results appearing on data transfer path 226 15 clock cycles later. Where MAF unit 220 can perform only one set of table lookups per clock cycle, input and output sequencing logic can be provided to implement this desired behavior.

More specifically, FIG. 12 is a block diagram showing a MAF unit 220 that is enhanced with sequencing logic. Input sequencing logic 1202 is disposed between issue unit 204 and MAF unit 220 and receives the opcode and four operands x0, x1, x2, x3 from issue unit 204. On each of the next four clock cycles, input sequencing logic 1202 forwards the opcode and one of the four operands to stage 1 of MAF unit 220. Conventional circuits for latching and forwarding data with controlled delay may be used.

Output sequencing logic 1204 is disposed between MAF unit 220 and result path 226. Output sequencing logic 1204 latches results from the four operations and, when all four have been collected, forwards the results together onto path 226. In some embodiments, MAF unit 220 may use just one of the four parallel pipelines in addition path 714 (FIG. 7) to process all four operations. Alternatively, if each operation result appears on all four output paths $OUT_0$-$OUT_3$, output sequencing logic 1204 may be configured to latch a result from $OUT_0$ during one clock cycle, the result from $OUT_1$ on the next cycle, and so on until results from all four output paths have been latched. For each of the four operations, one or all of the pipeline paths might be active. As with input sequencing logic 1202, conventional circuits for latching and forwarding data with controlled delay may be used.

B. Planar Interpolation (PI) Operations

For PI operations, MAF unit 220 receives parameters A, B, C and quad center coordinates ($x_c$, $y_c$). In some embodiments, MAF unit 220 also receives four coordinate offsets ($dx_i$, $dy_i$), which may be in either signed or unsigned format. In other embodiments, the coordinate offsets ($dx_i$, $dy_i$) may be preselected and stored in MAF unit 220 rather than being supplied as operands.

During stage 1, alignment control circuit 704 determines shift amounts for products P1 and P2, as well as for parameters A, B and C, and generates appropriate Sh_P1, Sh_P2, Sh_A, Sh_B, and Sh_C signals. As described above, where $x_c$ and $y_c$ are fixed-point numbers while A, B and C are floating-point numbers, the shift amounts will depend only on the respective exponents of A, B and C. Thus, in some embodiments, some or all of these shift signals may be determined at the time A, B and C are computed (or at some other time prior to issuing the PI instruction to MAF unit 220) and provided to MAF unit 220 with the operands.

During stage 2, shift circuits 738, 740, and 736 apply shifts determined by the Sh_A, Sh_B, and Sh_C signals to parameters A, B and C. The μ1 selection mux 750 selects operand y. Lookup tables 742, 744, 762 might or might not be accessed; any returned value will be ignored.

During stage 3, operand $x_c$ is Booth encoded by Booth encoder 754 and selected as multiplier Bμ2 by selection mux 760. Operand $y_c$ is Booth encoded by Booth encoder 756 and provided as multiplier Bμ1. Operands A and B are selected as multiplicands M2 and M1, respectively, by selection muxes 746, 748. Shifted operand C is selected as result R4 by selection mux 766.

During stages 4-6, multiplier 718 computes P2=A*$x_c$ and multiplier 716 computes P1=B*$y_c$; these products may be provided in redundant or non-redundant form, as described above. In pixel offset section 712, shifted parameter C passes through on the R4 path. In path 900(0) of delta block 720 (FIG. 9), Booth encoder/mux 902 multiplies shifted parameter A by coordinate offset $dx_0$ while Booth encoder/mux 904 multiplies shifted parameter B by coordinate offset $dy_0$. The 4:2 CSA 910 adds A*$dx_0$+B*$dy_0$, and selection muxes 916, 918 select the redundant-form result as R0c, R0s. Paths 900(1)-900(3) perform parallel operations for the other coordinate offsets ($dx_i$, $dy_i$).

During stage 7, right shift circuits 732 and 734 apply right shifts to results P2 and P1 in response to the Sh_P2 and Sh_P1 signals from alignment control block 704. Shifting may be applied to redundant or non-redundant forms of P2 and P1 as described above. Adder 768(0) adds the R0c and R0s signals from delta block 720 to shifted parameter C from the R4 path, producing result $P0_0$ (which is $\Delta_0$ of Eq. 4) in carry-save form. Shifted P2 and P1 and result $P0_0$ are supplied to adder 722(0). In parallel, adders 768(1)-768(3) compute the corresponding delta terms $\Delta_i$ for the other pixel offsets, and shifted P2 and P1 are supplied to adders 722(1)-722(3) together with one of the results $P0_1$-$P0_3$.

During stage 8, adders 722($i$) each complete the computation of their respective P2+P1+$P0_i$, converting the result to a magnitude representation. During stages 9 and 10, normalization blocks 724($i$) normalize the results $R8_i$ to produce results $R9_i$.

For IPAW operations, perspective correction is applied using multipliers 726($i$) in stages 11-14. As described above, IPAW operations are advantageously performed after the perspective coordinate w has been interpolated and the interpolated value w' has been stored in an appropriate register. Where interpolation of w is performed using an IPA operation in MAF unit 220, a different w' corresponding to each pixel offset may be provided.

For IPA operations, perspective correction is not applied, and multipliers 726($i$) in stages 11-14 are advantageously bypassed using selection muxes 728($i$). The bypass path may include timing circuitry for delaying propagation of the result by an appropriate number of cycles.

During stage 15, output control circuits 706($i$) format and select the appropriate result for propagation on paths $OUT_0$-$OUT_3$.

In embodiments which include input and output sequencing logic (e.g., FIG. 12), this logic advantageously is not used to sequence the IPA and IPAW operations; all four values can be computed in parallel. Accordingly, when the OPCTL signals provided to input sequencing logic 1002 and output sequencing logic 1004 indicate planar interpolation, these circuits may operate in a pass-through or bypass mode.

C. Double-Precision Multiplication (DMUL) Operations

For DMUL operations, MAF unit 220 receives operands α and β. In some embodiments, the operands are in fp64 format as described above.

During stage 1, alignment control circuit 704 sets the Sh_P1 control signal to a right-shift of 27 bits and the Sh_P2 control signal to a zero right shift. Other control signals generated by alignment control circuit 704 are not used in DMUL operations and may be set to any convenient value.

Also during stage 1, DP operand preparation block 770 (FIG. 8B) stores the mantissa portions of operands α and β into registers 826 and 828 in preparation for sequential output of the multiplicand and multiplier portions. Sign logic circuit 844 determines the sign Sign_R of the product and provides the sign as the sign_res signal to output control block 706(1). DP operand preparation block 770 also extracts the exponent portions αexp and βexp of operands α and β and provides them to exponent logic block 778 in product path 710 (see FIG. 7B). Sequencer circuit 838 (FIG. 8B) operates selection muxes 834 and 836 to deliver the partial multiplicands and partial multipliers over four cycles.

Stages 2-8 are iterated four times in succession. The iterations may be pipelined with each other. For each iteration i=0, 1, 2, 3, sequencer circuit 838 delivers a triplet of operands ($α_H$, $α_L$, $β_i$) to product path 710 of FIG. 7B as described above. Pixel offset section 712 may operate or be placed in a power-saving mode since results $P0_i$ are not used in subsequent stages.

During each iteration of stage 2, muxes 772 and 750 in product path 710 each select operand $β_i$ as the multiplier. Exponent logic 778 operates on the exponents αexp and βexp to produce a result exponent Rexp as described above.

During each iteration of stage 3, multiplier βi is Booth encoded by Booth encoder 754 and also by Booth encoder 756. At the end of stage 3, selection mux 760 selects Booth-encoded $β_i$ as Bμ2. Multiplicand selection muxes 746 and 748 select partial operands $α_H$ and $α_L$, respectively.

During each iteration of stages 4-6, multiplier 718 computes the 41-bit sub-product P2=$α_H$*$β_i$ (41 bits) and multiplier 716 computes the 41-bit sub-product P1=$α_L β_i$.

During each iteration of stage 7, right shift circuit 734 right-shifts P1 by 27 bits, and conditional inverter 780 passes through the shifted P1 without further modification. Right-shift circuit 732 does not right-shift P2.

During each iteration of stage 8, adder 722(0) adds the new products P2 and P1 to the accumulated result (Pacc), which is initially zero as noted above. Log mux 1012 passes the result through to sticky bit reduction logic 1014, where the 14 LSBs are reduced to a single sticky bit that propagates with the result Pacc. Accumulation steering logic 1016 directs the result Pacc to selection mux 1020 for the next iteration.

After the final iteration of stage 8, the final result Pacc is propagated to adder 722(1) on path 723. In adder 722(1), a single normalization pass through stage 8 occurs. More specifically, selection mux 1054 selects the result Pacc. Rounding logic 1056 operates selection mux 1058 in response to the LSBs (including the sticky bit) of Pacc to select a rounding constant, either 0 or 1. The selected constant is propagated to CSA 1042 by selection mux 1060. At the end of the normalization pass in stage 8, the rounded result is delivered as result R$8_1$ to normalization block 724(1).

It should be noted that in some embodiments, the normalization pass through adder 722(1) can take place in parallel with the first iteration of a subsequent DMUL operation through adder 722(0). However, the initiation of operations such as UFA and PI are advantageously delayed long enough that they do not collide with the normalization pass.

During stages 9 and 10, normalization block 724(1) normalizes the result R$8_1$ to produce result R$9_1$. For DMUL operations, normalization block 724(1) increments the product exponent by 1 if the product of the mantissas is in the range [2, 4).

Perspective correction is generally not applicable to DMUL operations, and accordingly, multiplier 726(1) in stages 11-14 may be bypassed using selection mux 728(1). As noted above, the bypass path may include timing circuitry for delaying propagation of the result by an appropriate number of stages, or those stages may be skipped.

During stage 15, output control circuit 706(1) formats and selects the appropriate result for propagation on path $OUT_1$.

It should be noted that throughput for MAF unit 220 is reduced for DMUL operations as compared to UFA or PI operations. In the embodiment described herein, MAF unit 220 performs up to four PI operations in parallel and delivers four results in a single clock cycle. UFA operations are performed sequentially, with four results being delivered over four consecutive clock cycles. When a DMUL instruction is issued, issue logic 204 of FIG. 2 waits several cycles before issuing the next instruction, to allow time for the instruction to iterate through adder 722(0) and 722(1). For instance, if issue logic 204 can issue one UFA or PI instruction per clock cycle, then after each DMUL instruction, issue logic 204 advantageously waits three clock cycles before issuing the next instruction to MAF unit 220 in order to avoid potential collisions with the DMUL instruction. Thus, in the embodiment described herein, the throughput for DMUL operations in MAF unit 220 is approximately 1/16 the throughput for PI operations and 1/4 the throughput for UFA operations. MAF unit 220, however, has advantages in terms of chip area and cost, particularly because it can also be used for other operations.

D. Double-Precision Addition (DADD) Operations

For DADD operations, MAF unit 220 receives operands $\alpha$ and $\beta$. In some embodiments, the operands are in fp64 format as described above.

During stage 1, alignment control circuit 704 compares the exponent portions of operands $\alpha$ and $\beta$ and sets Sh_P1 to apply a right shift to the smaller of the operands. Alignment control circuit 704 also generates block exponent (B1_exp) and swap control (Swap) signals. DP preparation block 770 (FIG. 8B) forwards the mantissas $\alpha M$ and $\beta M$ to product path 710. Sign logic circuit 844 determines whether the operation entails a subtraction and generates the appropriate Inv_Ct1 signal.

During stage 3, muxes 746 and 748 of product path 710 (FIG. 7B) are operated as swap muxes, with mux 746 (748) selecting the larger (smaller) of operands $\alpha$ and $\beta$ as M2 (M1) based on the Swap signal from alignment control circuit 704. During stages 4-6, M2 and M1 are bypassed around multipliers 718 and 716, using bypass paths 717.

During stage 7, selection muxes 774 and 776 select the bypassed values. On the small operand path, shift circuit 734 applies the shift specified by the Sh_P1 control signal to the small operand M1, and conditional inverter 780 inverts M1 if a subtraction is in progress.

During stage 8, add block 722(0) computes the sum P2+P1. Selection mux 1020 may be operated to select Pacc, which is advantageously initialized to zero for each DADD operation. Initialization of Pacc to zero may be accomplished in the manner described above for DMUL operations. Sticky bit reduction logic 1014 may be used, although the result in this instance is 53 or 54 bits. Accumulation steering logic 1016 delivers the result Pacc to add block 722(1) via path 723.

In adder 722(1), a single normalization pass through stage 8 occurs. More specifically, selection mux 1054 selects the result Pacc. Rounding logic 1056 operates selection mux 1058 in response to the LSBs (including the sticky bit) of Pacc to select a rounding constant, either 0, 1, or 2. As noted above, 0 or 1 may be selected for positive sums to implement rounding, while 2 may be selected for negative results, to implement two's complement inversion. The selected constant is propagated to CSA 1042 by selection mux 1060. At the end of the normalization pass in stage 8, the rounded result is delivered as result R81 to normalization block 724(1).

During stages 9 and 10, normalization block 724(1) normalizes the result R$8_1$ to produce result R$9_i$. Normalization block 724(1) also modifies the block exponent B1_exp as needed in the event that the mantissa is shifted during normalization, thereby producing a final exponent Rexp.

Perspective correction is generally not applicable to DADD operations, and accordingly, multiplier 726(1) in stages 11-14 may be bypassed using selection mux 728(1). As noted above, the bypass path may include timing circuitry for delaying propagation of the result by an appropriate number of stages, or those stages may be skipped.

During stage 15, output control circuit 706(1) formats and selects the appropriate result for propagation on path $OUT_1$.

In an alternative embodiment, offset path 712 shown in FIG. 7C is used as a small operand path, while the P2 (or P1) path is used as the large operand path. A multiplexer operable as a swap mux may be added at stage 2 (prior to shifter 736), with the small operand being directed to the R4 path. Conditional inverter 767 is used to invert the small operand in the event of a subtraction.

It should be noted that throughput for MAF unit 220 is reduced for DADD operations as compared to UFA or PI operations. In the embodiment described herein, MAF unit 220 can perform up to four PI operations in parallel and deliver four results in a single clock cycle. UFA operations are performed sequentially, with up to four results being delivered over four consecutive clock cycles. When a DADD instruction is issued, issue logic 204 of FIG. 2 waits at least one cycle before issuing the next instruction to MAF unit 220, to allow time for the instruction to propagate serially through adder 722(0) and 722(1). For instance, if issue logic 204 can issue one UFA or PI instruction per clock cycle, then after a DADD instruction, issue logic 204 waits one clock cycle before issuing the next instruction to MAF unit 220 in order to avoid potential collisions with the DADD instruction. Thus, in the embodiment described herein, the throughput for DADD operations in MAF unit 220 is approximately 1/8 the throughput for PI operations and 1/2 the throughput for UFA operations. MAF unit 220, however, has advantages in terms of chip area and cost, particularly because it can also be used for other operations.

IV. Further Embodiments

While the invention has been described with respect to specific embodiments, one skilled in the art will recognize that numerous modifications are possible. For instance, a MAF unit may be implemented to support more, fewer, or different functions in combination and to support operands and results in any format or combinations of formats.

In one alternative embodiment, MAF unit 220 leverages multipliers 726($i$) as general-purpose multiplication circuits to support a single-precision floating point or integer multiply (SMUL) operation in addition to the UFA and PI operators described above. In one embodiment, the SMUL operation for operands (factors) $a_1$ and $a_2$ is implemented by bypassing the operands into one of multiplier blocks 726 (FIG. 7).

More specifically, FIG. 13 is a block diagram of a multiplier block 726(0) that supports an SMUL operation in addition to the IPAW operation. Selection mux 1302 operates to select either result $R9_0$ from normalization unit 724(0) or factor $a_1$ from an operand input path 1303, and selection mux 1304 operates to select either perspective parameter $w_0'$ from a register 1305 or factor $a_2$ from an operand input path 1307. Selection muxes 1302, 1304 are advantageously operated in response to a common OPCTL signal so that $a_1$ and $a_2$ are selected in the case of an SMUL operation and $R9_0$ and $w_0'$ are selected in the case of an IPAW operation. For other operations, selection mux 728(0) selects result $R9_0$, and the operation of selection muxes 1302, 1304 is irrelevant to the final result. In some embodiments, multiplier 726(0) may be in a low-power idle state during operations where its result is not selected.

A Booth encoder 1310 encodes the selected multiplier (either $\alpha_2$ or $w'_0$), and a multiplier tree 1312 performs the multiplication. The result $R11_0$ is provided to multiplexer 728(0) as shown in FIG. 7.

Multipliers 726(1)-726(3) may be configured similarly to multiplier 726(0), and MAF unit 220 in this embodiment may support parallel execution of up to four SMUL operations using different operands.

In another alternative embodiment, MAF unit 220 may also support a general quadratic polynomial operation that computes $a_2*x^2+a_1*x+a_0$ for arbitrary coefficients $a_2, a_1, a_0$, which can be supplied on the same paths as parameters A, B, and C. MAF unit 220 might also be extended to support interpolation in three dimensions, cubic polynomial computations and so on.

In addition, while the MAF unit described herein supports parallel computation of PI operations for four (x, y) locations in parallel, it will be appreciated that parallel PI operations for any number of locations (including just one location or more than four locations) could be supported. In addition, the parallel computation paths for PI operations can be leveraged to support parallel execution of other operations, such as UFA or SMUL operations.

Further, instead of supplying the interpolation parameters A, B, and C as operands together with the PI opcode and (x, y) operands as described above, these parameters might be provided to the MAF unit in advance and stored by the MAF unit, e.g., in internal state registers, for use in subsequent PI operations. A special opcode may be used to signal the MAF unit to store or update these parameter values.

Double-precision multiplication may be implemented in any functional unit that provides a single-precision (or smaller) multiplier capable of generating sub-products and a sufficiently wide adder to accumulate the sub-products. Those skilled in the art will recognize that the principle of dividing the product into sub-products to be accumulated can be extended to any division, not limited to the eightfold division described herein. Any number of sub-products may be generated in parallel (depending on the availability of multipliers), and any number of iterations may be performed to accumulate the product result.

"Double precision" and "single precision," as used herein, are not limited to fp64 and fp32 formats; these terms refer generally to two different floating-point formats where the "double precision" format uses a larger number of bits to represent a larger range of values and/or a higher precision (e.g., more significant bits) in the values represented than the "single precision" format.

The various bypass paths and pass-throughs described herein may also be varied. In many instances, where a bypass path around a circuit block is described, that path may be replaced by an identity operation (i.e., an operation with no effect on its operand, such as adding zero or multiplying by one) in that block and vice versa. A circuit block is bypassed during a given operation may be placed into an idle state (e.g., a reduced power state) or operated normally with its result being ignored by downstream blocks, e.g., through operation of selection muxes or other circuits.

The division of the MAF pipeline into stages is arbitrary. The pipeline may include any number of stages, and the combination of components at each stage may be varied as desired. Functionality ascribed to particular blocks herein may also be separated across pipeline stages; for instance, a multiplier tree might occupy multiple stages.

The functionality of various blocks may also be modified. In some embodiments, for example, different adder circuits or multiplier circuits may be used, and use of Booth2 encoding (or any other encoding) for multiplication is not required.

In addition, the MAF unit has been described in terms of circuit blocks to facilitate understanding; those skilled in the art will recognize that the blocks may be implemented using a variety of circuit components and layouts and that blocks described herein are not limited to a particular set of components or physical layout. Blocks may be physically combined or separated as desired.

A processor may include one or more MAF units in an execution core. For example, where superscalar instruction issue (i.e., issuing more than one instruction per cycle) is desired, multiple MAF units may be implemented, and different MAF units may support different combinations of functions. A processor may also include multiple execution cores, and each core may have its own MAF unit(s).

Further, while the invention has been described with reference to a graphics processor, those skilled in the art will appreciate that the present invention may also be employed in other processors such as math co-processors, vector processors, or general-purpose processors.

Thus, although the invention has been described with respect to specific embodiments, it will be appreciated that the invention is intended to cover all modifications and equivalents within the scope of the following claims.

What is claimed is:

1. A multipurpose functional unit for a processor, the functional unit comprising:
   an input section configured to receive an opcode designating one of a plurality of supported operations to be performed and one or more operands on which the designated operation is to be performed, the input section being further configured to generate a plurality of control and data signals in response to the received opcode and operands;
a multiplication pipeline including a multiplier circuit having a height and a width, at least one of the height or the width being less than a double-precision mantissa size, the multiplication pipeline being coupled to receive a first subset of the control and data signals from the input section, the multiplication pipeline being configured to select a plurality of factors based on the received control and data signals and to operate the multiplier circuit to compute one or more products from the plurality of factors, the factors including M2, μ2, M1, and μ1,
wherein in the event the opcode designates an operation other than a double-precision multiplication (DMUL) operation, M2 is received from a first multiplexer coupled to receive a first operand A and a first coefficient $F_2(x_b)$ provided by a first lookup table, M1 is received from a second multiplexer coupled to receive a second operand B and a second coefficient $F_1(x_b)$ provided by a second lookup table, μ2 is received from a third multiplexer coupled to receive a third operand $x_c$ and the square of a fourth operand $x_h$, and μ1 is received from a fourth multiplexer coupled to receive fourth operand $x_h$ and a fifth operand $y_c$; and the one or more products comprise M2*μ2 and M1*μ1 from the selected inputs M2, μ2, M1, and μ1, and
wherein in the event that the opcode designates the DMUL operation, for each of a plurality of iterations within the functional unit: a first portion and a second portion of a mantissa of a first input operand are selected as inputs M2 and M1, respectively; a portion of a mantissa of a second input operand is selected as both of inputs μ2 and μ1, wherein a different portion of the mantissa of the second input operand is selected for each of the plurality of iterations; and a pair of multiplier circuits in the functional unit compute products of the form M2*μ2 and M1*μ1 from the selected inputs M2, μ2, M1, and μ1, and
an addition pipeline coupled to receive one or more products from the multiplication pipeline, the addition pipeline being configured to perform an addition operation using the one or more products to produce an operation result,
wherein in the event the opcode designates an operation other than a DMUL operation, the operation result comprises M2*μ2+M1*μ1+M0 from the products M2*μ2 and M1*μ1 and the selected input M0,
wherein in the event the opcode designates the DMUL operation, the addition pipeline adds the products M2*μ2 and M1*μ1 to a running sum,
wherein the plurality of supported operations includes the DMUL operation that is executed using multiple iterations through at least a portion of the multiplication pipeline and at least a portion of the addition pipeline, a unary function approximation (UFA) operation, and a planar interpolation (PI) operation wherein:
the UFA operation for an input operand x and a unary function $f(x)$ to be approximated includes computation of a quadratic polynomial of the form:

$$f(x) \approx F_2(x_b)*x_h^2 + F_1(x_b)*x_h + F_0(x_b),$$

wherein $x_b$ is a baseline value, $x_h$ is the difference between the input operand x and the baseline value $x_b$, and $F_2$, $F_1$ and $F_0$ are coefficients determined based on the baseline value $x_b$ and the unary function $f(x)$; and the PI operation for input coordinates (x, y) includes computation of a planar function U(x, y) of the form:

$$U(x,y)=A*x_c+B*y_c+\Delta,$$

wherein A, B, and C are interpolation parameters and A is an offset term that depends at least in part on the interpolation parameter C.

2. The functional unit of claim 1 wherein the width of the multiplier circuit is at least half of the double-precision mantissa size but less than the double-precision mantissa size,
wherein the multiplication pipeline is further configured such that in the event that the opcode designates the DMUL operation, during each iteration through the portion of the multiplication pipeline, the multiplier circuit multiplies an upper half or a lower half of a first double-precision mantissa by at least a portion of a second double-precision mantissa.

3. The functional unit of claim 1 wherein the height of the multiplier circuit is smaller than the double precision mantissa size, wherein the multiplication pipeline is further configured such that in the event that the opcode designates the DMUL operation, during each iteration through the portion of the multiplication pipeline, the multiplier circuit multiplies at least a portion of a first double precision mantissa by a portion of a second double precision mantissa.

4. The functional unit of claim 1 wherein the addition pipeline is further configured such that in the event that the opcode designates the DMUL operation, during each iteration through the portion of the addition pipeline, the addition pipeline adds the one or more products produced by the multiplication pipeline to a running sum result.

5. The functional unit of claim 1 wherein the UFA operation and the PI operation are each executed using a single pass through the multiplication pipeline and the addition pipeline.

6. A multipurpose functional unit for a processor, the functional unit comprising:
an input section configured to receive an opcode designating one of a plurality of supported operations to be performed and one or more operands on which the designated operation is to be performed, the input section being further configured to generate a plurality of control and data signals in response to the received opcode and operands;
a multiplication pipeline including a plurality of multiplier circuits, each of the multiplier circuits having a height that is less than a double precision mantissa size, the multiplication pipeline being coupled to receive a first subset of the control and data signals from the input section, the multiplication pipeline being configured to select a plurality of pairs of factors based on the received control and data signals and to operate the plurality of multiplier circuits to compute a respective one of a plurality of products from each of the pairs of factors, the pairs of factors including M2 and μ2, and M1 and μ1,
wherein in the event the opcode designates an operation other than a double-precision multiplication (DMUL) operation, M2 is received from a first multiplexer coupled to receive a first operand A and a first coefficient $F_2(x_b)$ provided by a first lookup table, M1 is received from a second multiplexer coupled to receive a second operand B and a second coefficient $F_1(x_b)$ provided by a second lookup table, μ2 is received from a third multiplexer coupled to receive a third operand $x_c$ and the square of a fourth operand $x_h$, and μ1 is received from a fourth multiplexer coupled to receive fourth operand $x_h$ and a fifth operand $y_c$; and the plurality of products comprise M2*μ2 and M1*μ1 from the selected inputs M2, μ2, M1, and μ1, and wherein in the event that the opcode designates the DMUL operation, for each of a plurality of iterations within the functional unit: a first portion and a second portion of a mantissa of a first input operand are selected as inputs M2 and M1, respectively; a portion of a mantissa of a second input operand is selected as both of inputs μ2 and μ1, wherein a different portion of the mantissa of the second input operand is selected for each of the plurality of iterations; and a pair of multiplier circuits in the functional unit compute products of the form M2*μ2 and M1*μ1 from the selected inputs M2, μ2, M1, and μ1, and an addition pipeline coupled to receive the plurality of products from the multiplication pipeline, the addition pipeline being configured to add the plurality of products to produce an operation result, wherein in the event the opcode designates an operation other than a DMUL operation, the operation result comprises M2*μ2+M1*μ1+M0 from the products M2*μ2 and M1*μ1 and the selected input M0, wherein in the event the opcode designates the DMUL operation, the addition pipeline adds the products M2*μ2 and M1*μ1 to a running sum, wherein the plurality of supported operations includes the DMUL operation that is executed using a plurality of iterations through at least a portion of the multiplication pipeline and at least a portion of the addition pipeline, a unary function approximation (UFA) operation, and a planar interpolation (PI) operation wherein: the UFA operation for an input operand x and a unary function $f(x)$ to be approximated includes computation of a quadratic polynomial of the form:

$$f(x) \approx F_2(x_b) * x_h^2 + F_1(x_b) * x_h + F_0(x_b),$$

wherein $x_b$ is a baseline value, $x_h$ is the difference between the input operand x and the baseline value $x_b$ and $F_2$, $F_1$ and $F_0$ are coefficients determined based on the baseline value $x_b$ and the unary function $f(x)$; and the PI operation for input coordinates (x, y) includes computation of a planar function U(x, y) of the form:

$$U(x,y) = A * x_c + B * y_c + \Delta,$$

wherein A, B, and C are interpolation parameters and A is an offset term that depends at least in part on the interpolation parameter C.

7. The functional unit of claim 6 wherein the input section includes:

an operand preparation unit configured to receive first and second double-precision input operands having respective first and second mantissas, the operand preparation unit further configured such that in the event that the opcode designates the DMUL operation, the second mantissa is split into a plurality of portions and the first mantissa and a different one of the plurality of portions of the second mantissa are delivered to the multiplication pipeline during each of the plurality of iterations through the multiplication pipeline.

8. The functional unit of claim 7 wherein each of the plurality of multipliers has a width that is less than the double precision mantissa size, wherein the operand preparation unit is further configured such that in the event that the opcode designates the DMUL operation, the first mantissa is split into a plurality of portions and at least two portions of the first mantissa are delivered to the multiplication pipeline during each of the plurality of iterations through the multiplication pipeline.

9. The functional unit of claim 8 wherein the multiplication pipeline is further configured such that in the event that the opcode designates the DMUL operation, during each iteration through the portion of the multiplication pipeline, each of the multiplier circuits multiplies a different one of the portions of the first mantissa received from the operand preparation unit by the one of the portions of the second mantissa received from the operand preparation unit.

10. The functional unit of claim 6 wherein the addition pipeline is further configured such that in the event that the opcode designates the DMUL operation, during each iteration through the portion of the addition pipeline, the addition pipeline adds the plurality of products produced by the multiplication pipeline to a running sum result.

11. The functional unit of claim 10 wherein the addition pipeline is further configured such that in the event that the opcode designates the DMUL operation, the addition pipeline reduces a plurality of least significant bits of the running sum result to a single bit during each iteration through the portion of the addition pipeline.

12. The functional unit of claim 10 wherein the plurality of supported operations further includes a double precision addition (DADD) operation that adds first and second double precision operands having respective first and second mantissas, wherein the multiplication pipeline is further configured such that, in the event that the opcode designates the DADD operation, the multiplication pipeline supplies the first and second mantissas to the addition pipeline via a path that bypasses the plurality of multiplier circuits, and wherein the addition pipeline is further configured such that, in the event that the opcode designates the DADD operation, the addition pipeline adds the first and second mantissas.

13. The functional unit of claim 6 wherein the UFA operation and the PI operation are each executed using a single pass through the multiplication pipeline and the addition pipeline.

14. The functional unit of claim 6 wherein the input operand x and the coefficients $F_2$, $F_1$, and $F_0$ for the UFA operation and the input coordinates (x, y) and the interpolation parameters A, B, and C for the PI operation each have a size smaller than a double-precision mantissa size.

15. A method for operating a functional unit of a microprocessor, the method comprising:

receiving an opcode designating one of a plurality of supported operations to be performed and one or more operands on which the designated operation is to be performed, the plurality of supported operations including a double-precision multiplication (DMUL operation) and at least one other operation that operates on operands at less than double precision;

in the event that the opcode designates an operation other than the DMUL operation:

in response to the opcode and the one or more operands, selecting a plurality of inputs M2, μ2, M1, μ1, and M0, wherein selecting M2 includes selecting between a first operand A and a first coefficient $F_2(x_b)$ provided by a first lookup table, selecting M1 includes selecting between a second operand B and a second coefficient $F_1(x_b)$ provided by a second lookup table, selecting μ2 includes selecting between a third operand $x_c$ and the square of a fourth operand $x_h$, and selecting µ1 includes selecting between the fourth operand $x_h$ and a fifth operand $y_c$; and operating a pair of multiplier circuits in the functional unit to compute products of the form M2*µ2 and M1*µ1 from the selected inputs M2, µ2, M1, and µ1; and operating an addition block in the functional unit to compute an operation result of the form M2*µ2+M1*µ1+M0 from the products M2*µ2 and M1*µ1 and the selected input M0; and in the event that the opcode designates the DMUL operation, for each of a plurality of iterations within the functional unit:

selecting a first portion and a second portion of a mantissa of a first input operand as inputs M2 and M1, respectively;

selecting a portion of a mantissa of a second input operand as both of inputs µ2 and µ1, wherein a different portion of the mantissa of the second input operand is selected for each of the plurality of iterations;

operating the pair of multiplier circuits in the functional unit to compute products of the form M2*µ2 and M1*µ1 from the selected inputs M2, µ2, M1, and µ1; and operating the addition block in the functional unit to add the products M2*µ2 and M1*µ1 to a running sum.

16. The method of claim 15 wherein the plurality of supported operations further includes a unary function approximation (UFA) operation for approximating a unary function $f(x)$ of an argument operand x and a planar interpolation (PI) operation for performing planar interpolation on coordinate operands x and y.

17. The method of claim 16, wherein in the event that the opcode designates an operation other than the DMUL operation, selecting the plurality of inputs M2, µ2, M1, µ1 and M0 includes:

in the event that the UFA operation is designated, selecting the plurality of inputs M2, µ2, M1, µ1 and M0 such that the configurable arithmetic circuits compute an operation result corresponding to $F_2(x_b)*x_h^2+F_1(x_b)*x_h+F_0(x_b)$, wherein $x_b$ is a baseline value, $x_h$ is the difference between the argument operand x and the baseline value $x_b$, and $F_2$, $F_1$, and $F_0$ are coefficients determined based on the baseline value $x_b$ and the unary function $f(x)$; and in the event that the PI operation is designated, selecting the plurality of inputs M2, µ2, M1, µ1 and M0 such that the configurable arithmetic circuits compute an operation result corresponding to $A*x_c+B*y_c+\Delta$, wherein A, B, and C are interpolation parameters and $\Delta$ is an offset term that depends at least in part on the interpolation parameter C.

* * * * *